(12) United States Patent
Ahmed et al.

(10) Patent No.: US 8,891,695 B2
(45) Date of Patent: Nov. 18, 2014

(54) MAXIMIZING THE VITERBI WINNING PATH METRIC TO ESTIMATE CARRIER PHASE OFFSET IN CONTINUOUS PHASE MODULATED SIGNALS

(75) Inventors: I. Zakir Ahmed, Bangalore (IN); Vijaya Yajnanarayana, Bangalore (IN)

(73) Assignee: National Instruments Corporation, Austin, TX (US)

( * ) Notice: Subject to any disclaimer, the term of this patent is extended or adjusted under 35 U.S.C. 154(b) by 257 days.

(21) Appl. No.: 13/460,031

(22) Filed: Apr. 30, 2012

(65) Prior Publication Data

US 2013/0287147 A1    Oct. 31, 2013

(51) Int. Cl.
*H04L 27/06* (2006.01)

(52) U.S. Cl.
USPC .......................................................... 375/341

(58) Field of Classification Search
CPC .................................................. H04L 27/0012
USPC .......................................................... 375/341
See application file for complete search history.

(56) References Cited

U.S. PATENT DOCUMENTS

| | | | | |
|---|---|---|---|---|
| 2008/0123779 | A1* | 5/2008 | Norris | 375/326 |
| 2013/0142286 | A1* | 6/2013 | Norris et al. | 375/324 |
| 2013/0301697 | A1* | 11/2013 | Liu et al. | 375/233 |

OTHER PUBLICATIONS

Maiolo, Marilena; Luise, Marco; "Blind Symbol Timing Recovery for Multi-Level/Multi-h CPM signals with High Spectral Efficiency;" 9th International Workshop on Signal Processing for Space Communications (SPSC 2006), ESTEC, Noordwijk, The Netherlands, Sep. 2006; pp. 1-7.
Aulin, Tor; Sundberg, Carl-Erik W.; "Continuous Phase Modulation—Part I: Full Response Signaling;" IEEE Transactions on Communications, vol. Com-29, No. 3, Mar. 1981; pp. 196-209.
Lindsey, William C.; Chie, Chak Ming; "A Survey of Digital Phase-Locked Loops;" Proceedings of the IEEE, vol. 69, No. 4, Apr. 1981; pp. 410-431.
Anderson et al.; "Digital Phase Modulation;" Chapter 7, "Receivers", Kluwer Academic/ Plenum Publishers, Sep. 1, 1986; pp. 237-278.
Anderson et al.; "Digital Phase Modulation;" Chapter 9, "Synchronization", Kluwer Academic/ Plenum Publishers, Sep. 1, 1986; pp. 357-385.
Proakis, John J.; "Digital Communications;" Section 10.1, Fourth Edition, McGraw Hill Publications, Aug. 28, 2000; pp. 598-616.
Gardner, Floyd M.; "Phaselock Techniques;" Chapter 1 "Introduction", Third Edition, John Wiley & Sons, Inc., Jul. 29, 2005; Cover page and pp. 1-5.

* cited by examiner

*Primary Examiner* — Tanmay Shah
(74) *Attorney, Agent, or Firm* — Meyertons Hood Kivlin Kowert & Goetzel, P.C.; Jeffrey C. Hood; Mark K. Brightwell

(57) ABSTRACT

A system and method for estimating carrier frequency offset $\Delta f$ and carrier phase offset $\phi_0$ inherent in a received CPM signal. Samples of a continuous phase modulated (CPM) signal are received. A maximum of an objective function J is determined over a two-dimensional region parameterized by frequency offset v and phase offset w. The coordinates $v_{max}$ and $w_{max}$ of a maximizing point in the region represent estimates of the carrier frequency offset $\Delta f$ and the carrier phase offset $\phi_0$. To evaluate the objective function J at a point (v,w), apply a frequency shift of amount $-v$ and a phase shift of amount $-w$ to the received samples to obtain modified samples, and perform Viterbi demodulation on the modified samples to obtain a winning path metric value at a final time. The winning path metric value is the objective function value J(v,w).

21 Claims, 19 Drawing Sheets

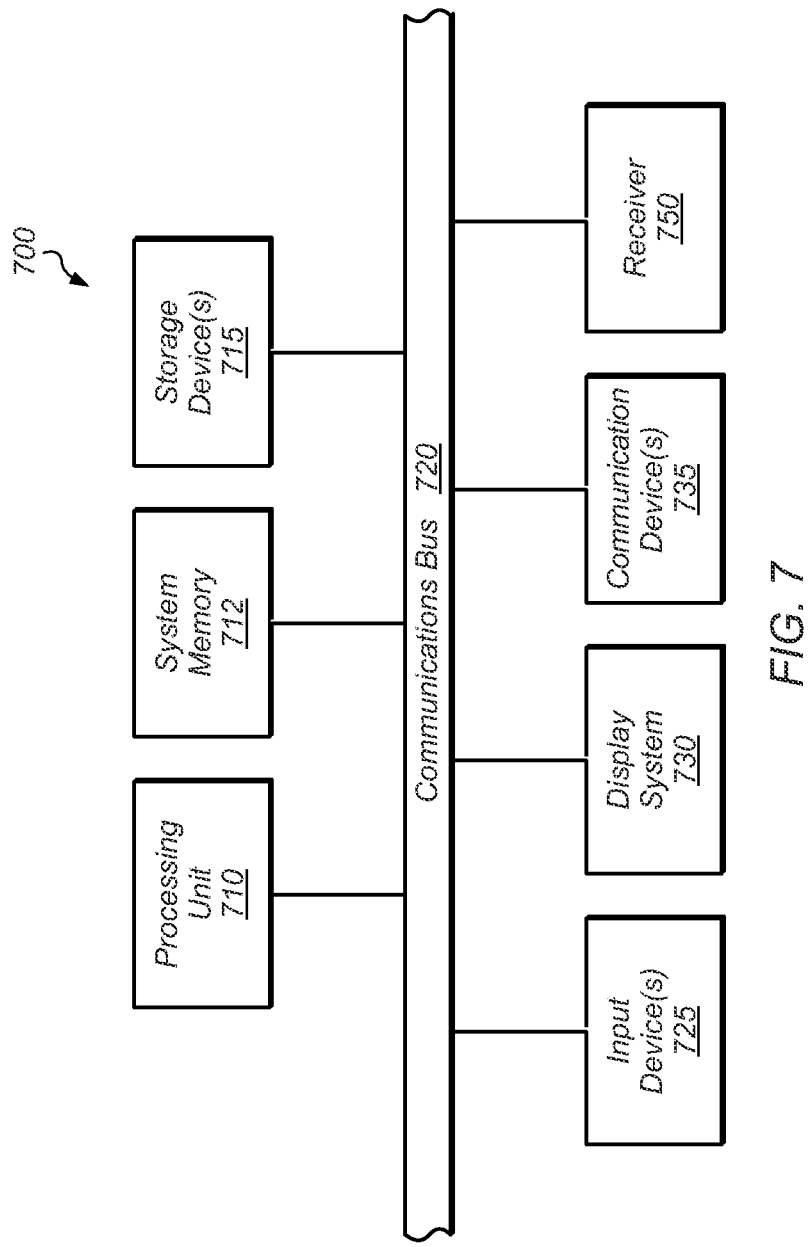

MAXIMIZING THE VITERBI WINNING PATH METRIC TO ESTIMATE CARRIER PHASE OFFSET IN CONTINUOUS PHASE MODULATED SIGNALS

FIELD OF THE INVENTION

The present invention relates to the field of signal processing, and more particularly to systems and methods for estimating the carrier frequency offset and carrier phase offset associated with the reception of a continuous phase modulated (CPM) signal.

DESCRIPTION OF THE RELATED ART

A receiver receives a continuous phase modulated (CPM) signal u(t) from a channel. (The signal has been transmitted onto the channel by a transmitter.) In the case of single-h CPM, the signal u(t) may be modeled by the expressions $$\phi(t) = 2\pi h \int_{-\infty}^{t} \sum_{i=-\infty}^{n} a_i g(\tau - iT) d\tau, \quad (1A)$$

$$u(t) = A\cos\{2\pi f_c t + \phi(t)\}, \quad (1B)$$

where T is the symbol period, where n=floor(t/T), where $a_i \in S_M$ is the $i^{th}$ symbol of the transmitted symbol sequence $\{a_i\}$, where the symbol set $S_M = \{\pm 1, \pm 3, \ldots, \pm(M-1)\}$. Since the symbol set $S_M$ has M elements, each symbol $a_i$ represents $\log_2(M)$ information bits. $f_c$ is the carrier frequency of the transmitted signal in Hz. The parameter h is the modulation index. The pulse shaping filter g(t) is of average amplitude 1/(2T) and duration T. Furthermore, the filter g(t) may be supported on the interval [0, T].

The receiver downconverts the signal u(t) using a local oscillator (LO) signal to obtain a baseband signal r(t) given by:

$$r(t) = A \cos\{2\pi(\Delta f)t + \phi(t) + \phi_0\} + n(t) \quad (1C)$$

where $\Delta f$ is the carrier frequency offset (CFO), and $\phi_0$ is the carrier phase offset (CPO). The carrier frequency offset $\Delta f$ is the difference between the receiver's local oscillator frequency and the carrier frequency implicit in the input signal. (The carrier frequency offset $\Delta f$ may include an offset between the receiver's LO frequency and the transmitter's LO frequency and/or a Doppler shift induced by motion of the receiver relative to the transmitter.)

The information-carrying phase $\phi(t)$ over the generic time interval $(n-1)T \le t \le nT$ can be expressed as follows:

$$\phi(t) = \phi((n-1)T) + 2\pi h a_n q(t-nT), \quad (2A)$$

where $$q(t) = \int_{-\infty}^{t} g(\tau) d\tau. \quad (2B)$$

The phase value $\phi((n-1)T)$ represents an accumulation of the phase steps from the symbols up to time $(n-1)T$, all of which have reached their steady state values. The phase value $\phi((n-1)T)$ is given by $$\phi((n-1)T) = \pi h \sum_{i=-\infty}^{n-1} a_i. \quad (3)$$

The phase trajectories $\{\phi(t)\}$ generated by all possible sequences $\{a_i\}$ of symbols define a trellis diagram.

More generally, the pulse shaping filter g(t) may have duration LT and be supported on the interval [0, LT], where L is a positive integer. If L=1, the CPM is said to be "full response CPM". If L>1, the CPM is said to be "partial response CPM".

In the context of partial response CPM, the phase function $\phi(t)$ may be expressed as:

$$\phi(t) = \phi((n-L)T) + 2\pi h \sum_{i=n-L+1}^{n} a_i q(t - iT).$$

One may attempt to demodulate the CPM signal r(t) by performing maximum likelihood sequence estimation (MLSE) using a Viterbi demodulator, e.g., as described in: (A) "Continuous Phase Modulation-Part I: Full Response Signaling", Tor Aulin and Carl-Erik w. Sundberg, IEEE TRANSACTIONS ON COMMUNICATIONS, VOL. COM-29, NO. 3, MARCH 1981 (hereinafter referred to as "Aulin"); (B) "Blind Symbol Timing Recovery for Multi-Level/Multi-h CPM signals with High Spectral Efficiency", Marilena Maiolo and Marco Luise, University of Pisa, Dip. Ingegneria Informazione (hereinafter referred to as "Maiolo"), and (C) "Digital Communications", Fourth Edition, John J. Proakis, McGraw Hill (hereinafter referred to as "Proakis").

However, the recovered symbol sequence will not be accurate if $\phi_0$ and $\Delta f$ are not known at least approximately. Thus, there exists a need for systems and method capable of estimating $\phi_0$ and $\Delta f$, especially in low SNR environments and/or in environments where the CPM signal doesn't include any pilot or preamble. The same observation holds for the demodulation of multi-h CPM signals.

The CPM signals and in particular multi-h CPM signals have been found to have very attractive characteristics like near zero PAPR (peak to average power ratio) and high spectral efficiencies, etc. In some applications, the communication is made secure by designing the signal to have no pilots or preambles. This calls for the design of blind receivers for CPM signals. This design problem presents a huge challenge, especially at low SNRs (signal to noise ratios). The main challenge is to lock to the intended signal (in both time and frequency). Frequency lock poses a huge challenge to the design engineer, especially when there are no preambles/pilots. Frequency lock could be achieved if one could either estimate or correct the carrier frequency offset (CFO) present in the baseband signal. The CFO may be due to the difference in frequency of the local oscillators used in the transmitter and receiver, and/or, due to the Doppler shift caused by the relative motion between the receiver and transmitter. The Doppler shift gets worse when the relative velocity is large. This situation is very common in telemetry and deep space communications.

Phase locked loops (PLLs) are a very attractive means of estimating and correcting the carrier frequency offsets and the carrier phase offsets in CPM signals. However, the design of a PLL at low SNRs can be quite complex and difficult.

SUMMARY

In one embodiment, a method for estimating carrier frequency offset $\Delta f$ may involve the following operations.

The method may include receiving a block of samples of a continuous phase modulated (CPM) signal from a receiver. The CPM signal may be single-h CPM signal or multi-h CPM signal.

The method may also include estimating the carrier frequency offset $\Delta f$ inherent in the CPM signal based on the received block of samples, where the process of estimating comprises computing a maximum of an objective function J as a function of frequency offset v. The maximizing value $v_{max}$ of the frequency offset v represents an estimate of the carrier frequency offset $\Delta f$. The action of computing the maximum includes computing a plurality of values J(v) of the objective function J at a respective plurality of values of the frequency offset v.

The action of computing the objective function value J(v) at any given one of the values of the frequency offset v comprises: frequency shifting the received block of samples by −v to obtain a frequency shifted block of samples; and performing Viterbi demodulation on the frequency shifted block of samples to obtain a winning path metric value at a final time, where the winning path metric value is the objective function value J(v).

The estimate $v_{max}$ of the carrier frequency offset $\Delta f$ may be stored in a memory.

The method may be performed blindly, i.e., without requiring the CPM signal to include a preamble or pilot. The carrier frequency offset may include a Doppler shift due to motion of the receiver relative to a transmitter. The carrier frequency offset may also include a difference between the receiver's local oscillator frequency and the transmitter's local oscillator frequency. By performing a traceback process on the results of the Viterbi demodulation that gave the maximum objective function value, the method may recover an estimate of the transmitted symbol sequence.

In another embodiment, a method for estimating a carrier phase offset $\phi_0$ may involve the following operations.

The method may include receiving a block of samples of a continuous phase modulated (CPM) signal from a receiver. The CPM signal may be single-h CPM signal or multi-h CPM signal.

The method may also include estimating the carrier phase offset $\phi_0$ inherent in the CPM signal based on the received block of samples, where the process of estimating comprises computing a maximum of an objective function J as a function of phase offset w. The maximizing value $w_{max}$ of the phase offset w represents an estimate of the carrier phase offset $\phi_0$. The action of computing the maximum includes computing a plurality of values J(w) of the objective function J at a respective plurality of values of the phase offset w.

The action of computing the objective function value J(w) at any given one of the values of the phase offset w comprises: phase shifting the received block of samples by −w to obtain a phase shifted block of samples; and performing Viterbi demodulation on the phase shifted block of samples to obtain a winning path metric value at a final time, wherein the winning path metric value is the objective function value J(w).

The estimate $w_{max}$ of the carrier phase offset $\phi_0$ may be stored in a memory.

The method may be performed blindly, i.e., without requiring the CPM signal to include a preamble or pilot. By performing a traceback process on the results of the Viterbi demodulation that gave the maximum objective function value, the method may recover an estimate of the transmitted symbol sequence.

In yet another embodiment, a method for estimating carrier frequency offset $\Delta f$ and carrier phase offset $\phi_0$ may involve the following operations.

The method may include receiving a block of samples of a continuous phase modulated (CPM) signal from a receiver. The CPM signal may be single-h CPM signal or multi-h CPM signal.

The method may also include estimating a carrier frequency offset $\Delta f$ and a carrier phase offset $\phi_0$ inherent in the CPM signal based on the received block of samples, where the process of estimating comprises computing a maximum of an objective function J over a region within a two-dimensional space parameterized by frequency offset v and phase offset w. The coordinates $v_{max}$ and $w_{max}$ of a maximizing point in the region represent respectively an estimate of the carrier frequency offset $\Delta f$ and an estimate of the carrier phase offset $\phi_0$. The action of computing the maximum includes computing a plurality of values J(v, w) of the objective function J at a respective plurality points (v, w) in the region.

The action of computing the objective function value J(v, w) at any given one of the points (v, w) comprises: applying a frequency shift of amount −v and a phase shift of amount −w to the received block of samples in order to obtain a modified block of samples; and performing Viterbi demodulation on the modified block of samples to obtain a winning path metric value at a final time, wherein the winning path metric value is the objective function value J(v,w).

The estimate $v_{max}$ of the carrier frequency offset $\Delta f$ and the estimate $w_{max}$ of the carrier phase offset $\phi_0$ may be stored in a memory.

The method may be performed blindly, i.e., without requiring the CPM signal to include a preamble or pilot. The carrier frequency offset may include a Doppler shift due to motion of the receiver relative to the transmitter. The carrier frequency offset may also include a difference between the receiver's local oscillator frequency and the transmitter's local oscillator frequency. By performing a traceback process on the results of the Viterbi demodulation that gave the maximum objective function value, the method may recover an estimate of the transmitted symbol sequence.

BRIEF DESCRIPTION OF THE DRAWINGS

A better understanding of the present inventions can be obtained when the following detailed description is considered in conjunction with the following drawings.

FIG. 7 illustrates one embodiment of a computer system 700 that may be used to implement any of the method embodiments described herein.

Figure 1A:
FIG. 1A shows one embodiment of a system including a transmitter and receiver that are configured to communicate wirelessly using CPM.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note that the various section headings within the following Detailed Description are for organizational purposes only and are not intended to be used to limit the claims.

DETAILED DESCRIPTION

Terminology

The following is a glossary of terms used in the present application:

Memory Medium—A medium configured for the storage and retrieval of information, including any of various types of memory devices or storage devices. The term "memory medium" is intended to include an installation medium, e.g., a CD-ROM, floppy disks 105, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as application specific integrated circuits (ASICs). In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a tablet computer, a wearable computer, etc.

FIG. 1A shows one embodiment of a system including a transmitter 10 and a receiver 15 that are configured to wirelessly communicate through a communication medium (e.g., the atmosphere, free space, a body of water) using continuous phase modulation (CPM), e.g., single-h CPM or multi-h CPM. The transmitter 10 is configured to modulate a stream of information bits onto a carrier using CPM, and to transmit the modulated carrier onto the communication medium, e.g., using antenna 12. The receiver 15 is configured to receive the modulated carrier from the communication medium (e.g., using antenna 17) and to recover an estimate of the stream of information bits using any of the method embodiments described herein. In some embodiments, one or both of the transmitter and receiver may be configured as a mobile device.

Figure 1B:
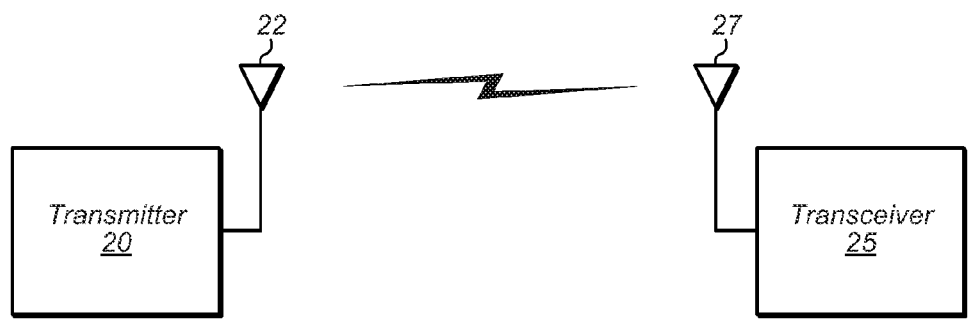
FIG. 1B shows one embodiment of a system including two transceivers that are configured to communicate wirelessly in a bi-directional fashion using CPM.

FIG. 1B shows one embodiment of a system including a transceiver 20 and a transceiver 25 that are configured to wirelessly communicate in a bi-directional fashion through a communication medium (e.g., the atmosphere, free space, a body of water) using continuous phase modulation (CPM), e.g., single-h CPM or multi-h CPM. The receiver subsystem of each transceiver is configured to employ any of the method embodiments described herein to recover information from the CPM signal transmitted by the other transceiver. In some embodiments, one of both of the transceivers may be configured as a mobile device. For example, transceiver 20 may be a base station and transceiver 25 may be a mobile device, e.g., a mobile device included in a cell phone, a handheld device, a satellite, a vehicle or aircraft, a mobile sensing device, etc.

Figure 1C:
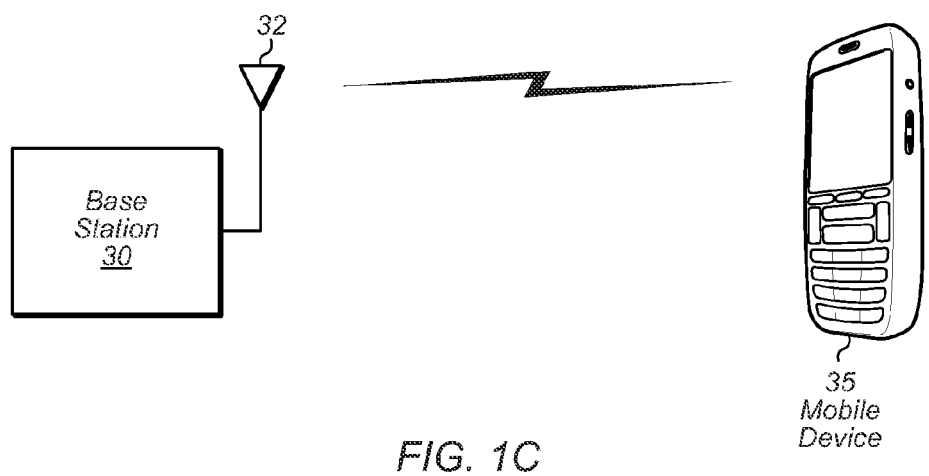
FIG. 1C shows one embodiment of a system including a base station and a mobile device 35 that are configured to communicate wirelessly in a bi-directional fashion using CPM.

FIG. 1C shows one embodiment of a system including a base station 30 and a mobile device 35 that that are configured to wirelessly communicate in a bi-directional fashion through a communication medium using CPM, e.g., single-h CPM or multi-h CPM. The mobile device may be a mobile phone, a mobile computing device, a mobile sensing device, etc. The receiver of the base station 30 and/or the receiver of the mobile device 35 may be configured to demodulate CPM signals using any of the method embodiments described herein.

In some embodiments, the present invention may estimate the phase offset $\phi_0$ and carrier frequency offset $\Delta f$ by performing a plurality of iterations, where each iteration includes selecting a candidate estimate (v, w) for the pair ($\Delta f$, $\phi_0$), adjusting the frequency and phase of the received signal respectively by $-v$ and $-w$, and performing Viterbi demodulation on the adjusted signal to obtain a winning path metric value. (For details on how to perform Viterbi demodulation on CPM signals, see, e.g., Aulin, Maiolo and Proakis.) A search procedure may be employed to maximize the winning path metric over a region within the two-dimensional (v, w) space. The Viterbi demodulation corresponding to the maximizing pair ($v_{max}$, $w_{max}$) produces as a by-product an estimate of the transmitted symbol sequence.

In some circumstances, the region may be centered on the origin (0, 0), e.g., when the receiver has made no previous estimate of the carrier frequency offset and carrier phase offset. However, if a previous estimate has been made (on a previous acquisition of the received signal), the region may be centered on the point (x,y), where x is the previous estimate of the carrier frequency offset and y is the previous estimate of the carrier phase offset. The size of the region may scale with the amount of time that has traversed since the previous estimate.

Let $\Phi$ denote the set of possible phase states for an ideal CPM signal at any given time nT, where n is an integer. (An ideal CPM signal is one with zero phase offset and zero carrier frequency offset and no noise.)

In prior art Viterbi demodulation, one computes a path metric PM(n) as the correlation between the received signal with each transmitted signal $S_k(t)$. The transmitted signal $S_k(t)$ can be expressed as $$S_k(t) = A \cos \{\phi(t,n-1) + 2\pi h a_k q(t-nT)\}, \quad (4)$$

where $a_k$ takes all possible values from the set $S_M = \{\pm 1, \pm 3, \ldots, \pm(M-1)\}$.

This correlation metric can be mathematically represented as shown below:

$$PM(n) = PM(n-1) + \max_k \int_{(n-1)T}^{nT} \text{Real}\{S_k^*(t)r(t)\} dt. \quad (5)$$

In equation (5), PM(n−1) represents the metric of the surviving sequences up to time (n−1)T. The additional term represents the correlation metric contributed by the received signal r(t) in the interval (n−1)T≤t≤nT. The maximization over index k keeps the surviving path and eliminates the rest.

From Aulin, Maiolo and Proakis, it can be observed that there will be $N_S M^L$ different values of the correlation metric $$\int_{(n-1)T}^{nT} \text{Real}\{S_k^*(t)r(t)\} dt$$

for each signal interval. ($N_S M^L$ corresponds to the product of $N_S M^{L-1}$ phase states and M transitions per phase state.) However, there is only one survivor path at each state and hence the number of surviving sequences at the end of each time step of the Viterbi demodulation will be $N_S M^{L-1}$. Here L is a positive integer that defines the duration of the pulse shaping filter g(t). If L=1, we have a full response CPM signal. If L>1, we have a partial response CPM signal.

If $h=\alpha/\beta$, where $\alpha$ and $\beta$ are positive integers with no common factors and $\alpha>\beta$, then the number $N_S$ of phase states for L=1 is given by:

$$N_S = \begin{cases} \beta & \text{if } \alpha \text{ is even} \\ 2\beta & \text{if } \alpha \text{ is even,} \end{cases}$$

More generally, the number of phase states is $N_S M^{L-1}$.

Figure 2A:
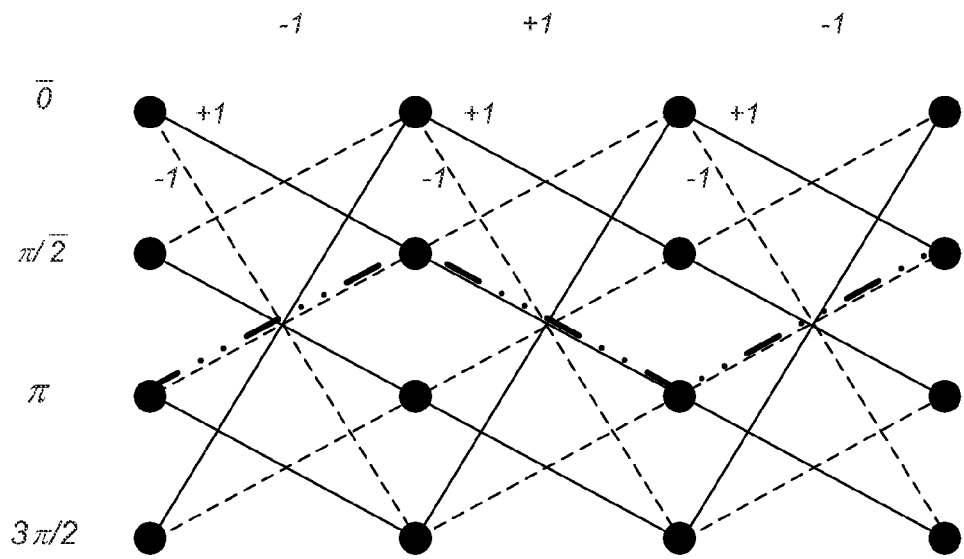
FIG. 2A shows the winning survivor path for a full response CPM signal with h=½, M=2, rectangular pulse shaping filter, and symbol sequence {−1, +1, −1}.

Let PM(N) be the surviving path at the end of NT signal duration. If there is no carrier offset, no phase offset and the SNR is high, it can be seen from equation (5) that PM(N)=N. One example of the trellis with a winning path PM(n) for a full response CPM signal with $h=\frac{1}{2}$, M=2, and a rectangular pulse shaping filter is shown in FIG. 2A. The thick dotted line indicates the phase trellis path for the symbol sequence {-1, +1, -1}.

In the present invention, the received signal is assumed to be impaired by the carrier frequency offset $\Delta f$ and/or the carrier phase offset $\phi_0$, and typically also additive noise. In one set of embodiments, a procedure for estimating $\Delta f$ and $\phi_0$ involves exploring (or searching) a region of a frequency-phase space.

The exploration involves performing a plurality of iterations, with each iteration corresponding to a respective pair (v, w) within the region. Furthermore, each iteration involves performing a Viterbi demodulation based on the following modified update equation for the path metric:

$$PM'_\beta(n, \Delta f, \phi_0, v, w) = PM'_\beta(n-1, \Delta f, \phi_0, v, w) + \max_k \int_{(n-1)T}^{nT} \text{Real}\{S_k^*(t)r(t)\exp(-j(2\pi vt + w)) + n(t)\}dt \quad (6)$$

Note that equation (6) differs from equation (5) by the presence of a digitally-introduced frequency and phase adjustment involving v and w. In particular, the received signal r(t) is digitally frequency shifted by -v and phase shifted by -w. (Equivalently, equation (6) may be interpreted as applying a frequency shift by +v and a phase shift by +w to the signal $S_k(t)$.) The 13 appearing in equation 6 as a subscript denotes the survivor path through the trellis that terminates at the final time NT on phase state $\eta \in \Phi$. (In other words, the final phase states are used to index the set of survivor paths.) Thus, there are $N_S M^{L-1}$ such survivor paths corresponding to the $N_S M^{L-1}$ possible phase states at time NT.

The path metric $PM'_\beta(N, \Delta f, \phi_0, v, w)$ is maximized over phase states $\beta$:

$$PM'(N, \Delta f, \phi_0, v, w) = \max_\beta \{PM'_\beta(N, \Delta f, \phi_0, v, w)\}. \quad (6B)$$

The survivor path that achieves the maximum path metric $PM'(N, \Delta f, \phi_0, v, w)$ is referred to herein as the winning path. The maximum value $PM'(N, \Delta f, \phi_0, v, w)$ of the path metric is referred to as the winning path metric value (WPMV).

The winning path metric value $PM'_\beta(N, \Delta f, \phi_0 v, w)$ depends on the values of v and w. The estimation procedure explores the (v, w) space in order to maximize the winning path metric value. The maximizing pair $(v_{max}, w_{max})$ represents an estimate of the impairment vector $(\Delta f, \phi_0)$.

To gain some insight into the iterative procedure, imagine substituting the expression (1B) into equation (6) and then evaluating the maximization over k by selecting the signal $S_k(t)$ that agrees with the transmitted signal $a_k$. Equation (6) then simplifies to:

$$PM'_\beta(n, \Delta f, \phi_0, v, w) = \quad (7)$$
$$PM'_\beta(n-1, \Delta f, \phi_0, v, w) + \int_{(n-1)T}^{nT} \text{Real}\{e^{j\{2\pi(\Delta f - v)t + (\phi_0 - w)\}} + n(t)\}dt$$

Observe that the complex exponential term in the integral reduces to unity when $v=\Delta f$ and $w=\phi_0$. In contrast, when v is not equal to $\Delta f$, and/or, when w is not equal to $\phi_0$, the real part of the complex exponential is less than unity. Thus, when $v=\Delta f$ and $w=\phi_0$, the integral is maximized. It then follows that the survivor path metric values and the winning path metric value WPMV will be maximized. Thus, we search for the maximizing values of v and w in order to estimate $\Delta f$ and $\phi_0$ respectively.

Figure 2B:
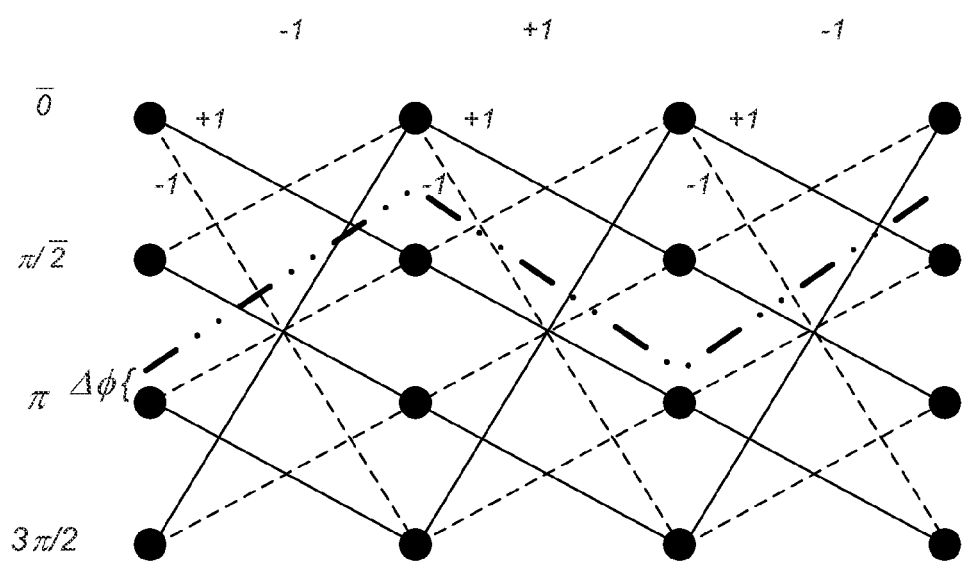
FIG. 2B shows the winning survivor path for a full response CPM signal with h=½, M=2, rectangular pulse shaping filter, and symbol sequence {−1, +1, −1} in the presence of carrier frequency offset equal to $\Delta f$ and phase offset equal to $\phi_0$.

FIG. 2B shows an example similar to the example of FIG. 2A, but with a non-zero carrier frequency offset $\Delta f$ and non-zero phase offset $\phi_0$. It can be observed that with the CFO, the phase trellis has a different slope, and the phase offset manifests itself as a change in the positions of the final states of the phase trellis.

The CFO and CPO can be estimated by jointly varying v and w such that $v_L \leq v \leq v_U$ and $w_L \leq w \leq w_U$, and finding the values $v_{max}$ and $w_{max}$ that maximize the winning path metric value WPMV. (In some embodiments, $v_L<0<v_U$ and $w_L<0<w_U$, e.g., $v_L=-v_U$ and $w_L=-w_U$.) The value $v_{max}$ represents an estimate $\Delta \hat{f}$ for the CFO $\Delta f$, and the value $w_{max}$ represents an estimate $\hat{\phi}_0$ for CPO $\phi_0$. In other words, $$(\Delta \hat{f}, \hat{\phi}_0) = \underset{(v,w)}{\arg\max} PM'(N, \Delta f, \phi_0, v, w). \quad (8)$$

Figure 3:
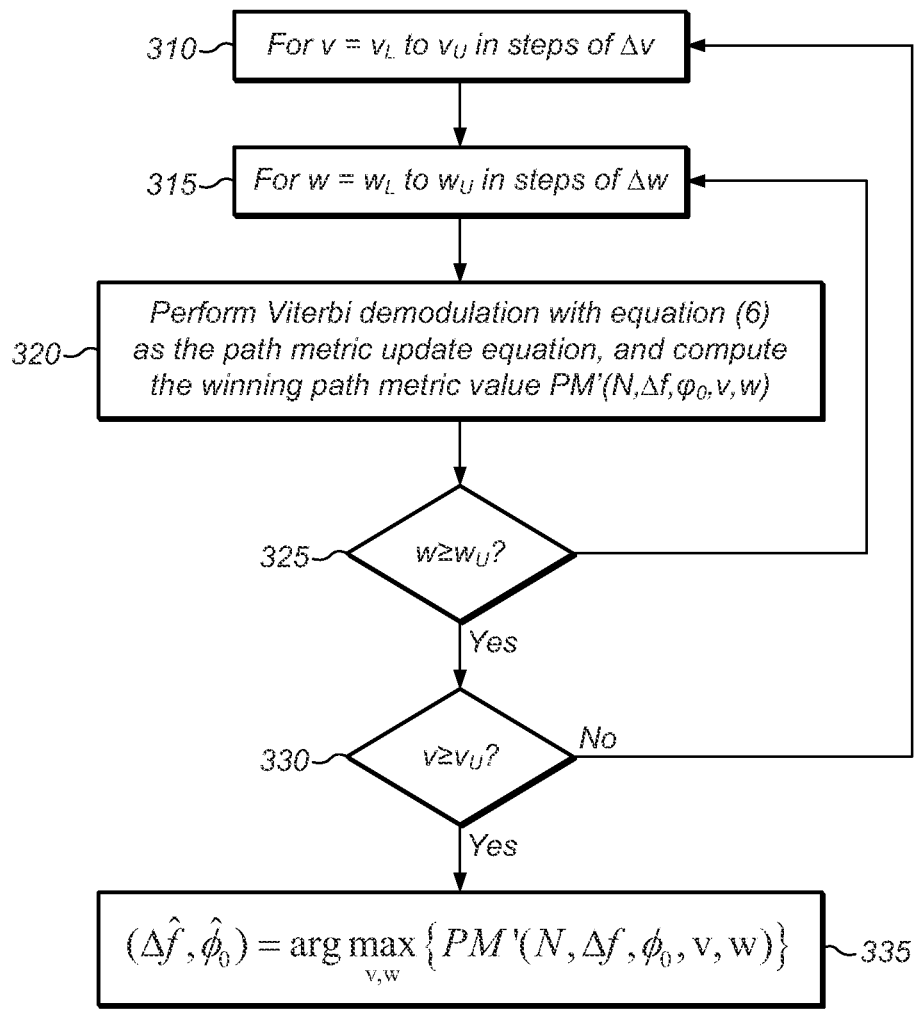
FIG. 3 is a flowchart illustrating one embodiment of a method for estimating the carrier frequency offset Δf and the carrier phase offset $\phi_0$.

One embodiment of the estimation algorithm is illustrated in the flow chart of FIG. 3. At 310, a outer loop in frequency adjustment variable v is initiated. The outer loop causes the variable v to increment from $v_L$ to $v_U$ in steps of size $\Delta v$. At 315, an inner loop on phase adjustment variable w is initiated. The inner loop causes the variable w to increment from $w_L$ to $w_U$ in steps of size $\Delta v$. At 320, Viterbi demodulation is performed with equation (6) as the update equation for the path metric, and the winning path metric value $PM'(N, \Delta f, \phi_0, v, w)$ is computed. At 325, a test is performed to determine if variable w has reached the upper limit $w_U$. If not, the next iteration of the inner loop is performed. If the upper limit $w_U$ has been reached, then control passes to operation 330. At 330, a test is performed to determine if variable v has reached the upper limit $v_U$. If not, the next iteration of the outer loop is performed. If the upper limit $v_U$ has been reached, then control passes to operation 335. At 335, the pair $(v_{max}, w_{max})$ that maximizes the winning path metric value $PM'(N, \Delta f, \phi_0, v, w)$ is set equal to the vector estimate $(\Delta \hat{f}, \hat{\phi}_0)$. In other words, $v_{max}$ is an estimate for $\Delta f$, and $w_{max}$ is an estimate for $\phi_0$.

Carrier Frequency Offset Estimation

Figure 4:
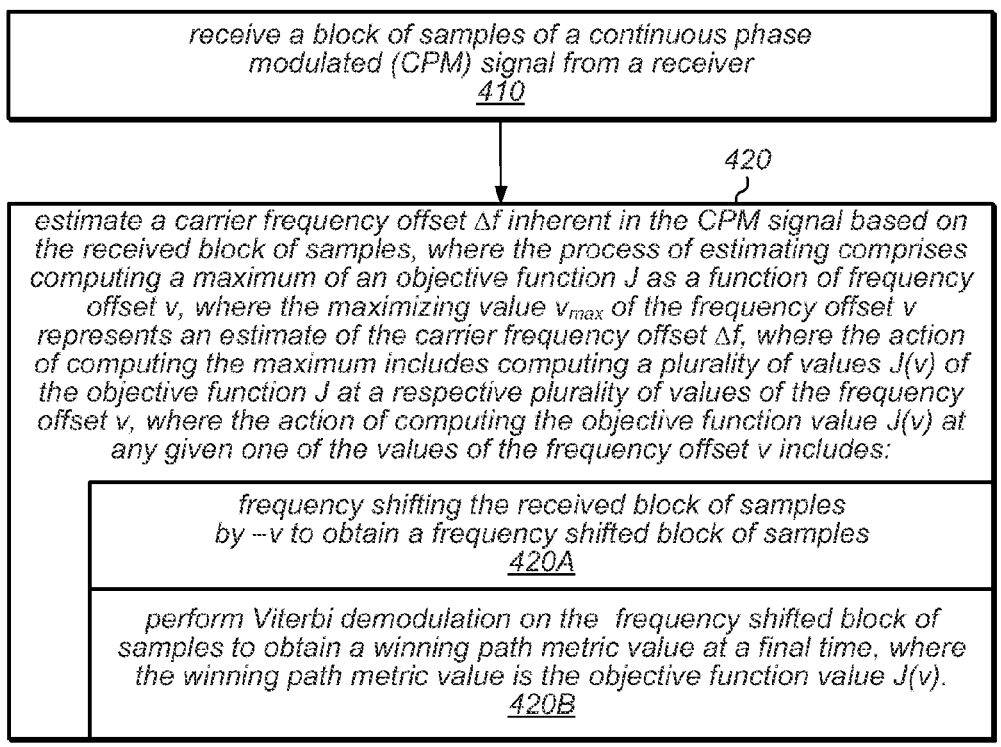
FIG. 4 is a flowchart illustrating one embodiment of a method for estimating the carrier frequency offset Δf associated with the reception of a CPM signal.

In one set of embodiments, a method 400 may include the operations shown in FIG. 4. (The method 400 may include any subset of the features described above.) The method 400 may be performed by a digital system, e.g., by a computer system, by a set of one or more programmable hardware elements, by custom designed circuitry such as one or more ASICs, or by any combination of the foregoing.

At 410, the digital system may receive a block of samples of a continuous phase modulated (CPM) signal from a receiver. The CPM signal may be a single-h CPM signal or a multi-h CPM signal.

The receiver may be configured to capture a CPM signal from a transmission medium (e.g., a cable or a wireless channel) and to downconvert the captured signal to baseband. The baseband signal may be digitized to produce the block of samples.

At 420, the digital system may estimate a carrier frequency offset $\Delta f$ inherent in the CPM signal based on the received block of samples. The process of estimating the carrier frequency offset $\Delta f$ comprises computing a maximum of an objective function J as a function of frequency offset v. The maximizing value $v_{max}$ of the frequency offset v represents an estimate of the carrier frequency offset $\Delta f$. The carrier frequency offset $\Delta f$ may include a Doppler shift due to motion of the receiver relative to a transmitter, and/or, a difference between a local oscillator frequency of the receiver and a local oscillator frequency of a transmitter.

The action of computing the maximum includes computing a plurality of values J(v) of the objective function J at a respective plurality of values of the frequency offset v. Any of a wide variety of known search algorithms may be employed to compute a maximum of the objective function.

The action of computing the objective function value J(v) at any given one of the values of the frequency offset v may include frequency shifting (420A) the received block of samples by $-v$ to obtain a frequency shifted block of samples, and performing Viterbi demodulation (420B) on the frequency shifted block of samples to obtain a winning path metric value at a final time. The winning path metric value is used as the objective function value J(v).

The computed estimate $v_{max}$ of the carrier frequency offset $\Delta f$ may be stored in a memory.

In some embodiments, the method 400 is performed blindly, i.e., without relying on a preamble or pilot. Indeed, in some embodiments, the CPM signal does not include any preamble or pilot.

In some embodiments, the estimate $v_{max}$ for the carrier frequency offset $\Delta f$ may be displayed on a display screen, e.g., incorporated into a displayed graph of carrier frequency offset versus time.

In some embodiments, the estimate $v_{max}$ may be used to adjust the frequency of the receiver's local oscillator to correct the carrier frequency offset.

In some embodiments, the method 400 includes performing a traceback process to recover information bits from the winning path of the Viterbi demodulation that corresponds to the maximum value of the objective function. (Recall that each objective function evaluation involves frequency shifting and performing a Viterbi demodulation. The Viterbi demodulation that corresponding the maximum winning path metric value is used to determined the information bits.) In various embodiments, the recovered information bits may represent an audio stream, a video stream, an image, a data file, etc. The recovered information bits may be used to drive an output device such as a speaker, a display device, etc. The recovered information bits may be stored in a memory for later retrieval and/or analysis.

In some embodiments, the method 400 may also include frequency shifting a second block of samples of the CPM signal by $-v_{max}$, and recovering information from the frequency-shifted second block by performing Viterbi demodulation on the frequency-shifted second block. In other words, the value $v_{max}$ determined in operation 420 based on the first sample block may be used to demodulate the second sample block without invoking the maximization process.

Carrier Phase Offset Estimation

Figure 5:
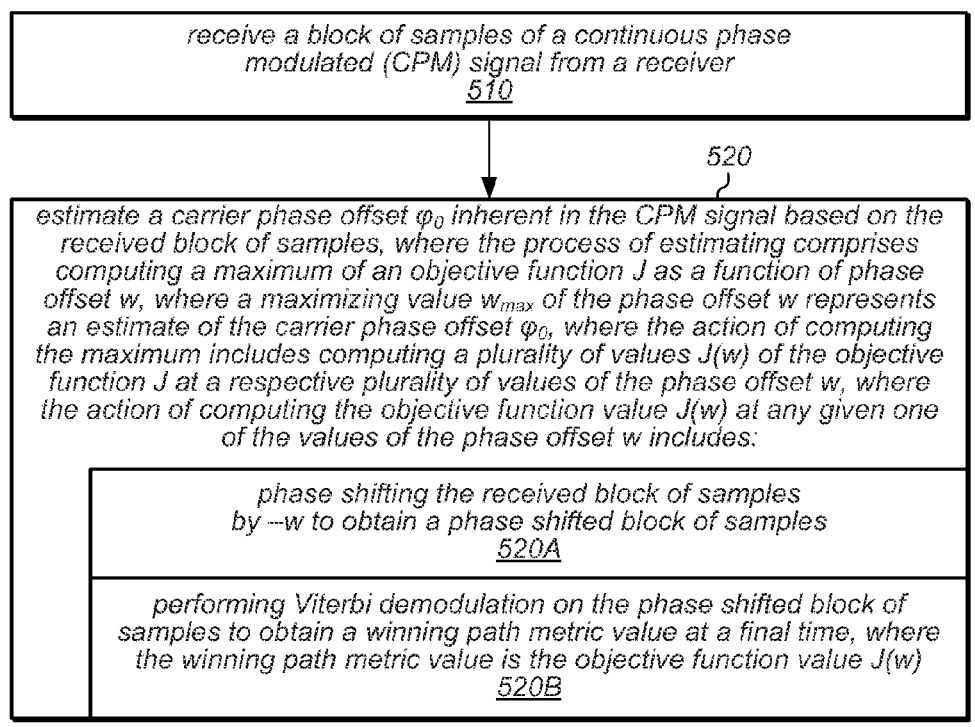
FIG. 5 is a flowchart illustrating one embodiment of a method for estimating the carrier phase offset $\phi_0$ associated with the reception of a CPM signal.

In one set of embodiments, a method 500 may include the operations shown in FIG. 5. (The method 500 may include any subset of the features described above.) The method 500 may be performed by a digital system, e.g., by a computer system, by a set of one or more programmable hardware elements, by custom designed circuitry such as one or more ASICs, or by any combination of the foregoing.

At 510, the digital system may receive a block of samples of a continuous phase modulated (CPM) signal from a receiver. The CPM signal may be a single-h CPM signal or a multi-h CPM signal.

At 520, the digital system may estimate a carrier phase offset $\phi_0$ inherent in the CPM signal based on the received block of samples. The process of estimating the carrier phase offset $\phi_0$ comprises computing a maximum of an objective function J as a function of phase offset w. The maximizing value $w_{max}$ of the phase offset w represents an estimate of the carrier phase offset $\phi_0$. The action of computing the maximum includes computing a plurality of values J(w) of the objective function J at a respective plurality of values of the phase offset w. Any of a wide variety of known search algorithms may be employed to compute a maximum of the objective function.

The action of computing the objective function value J(w) at any given one of the values of the phase offset w includes: phase shifting the received block of samples by $-w$ to obtain a phase shifted block of samples; and performing Viterbi demodulation on the phase shifted block of samples to obtain a winning path metric value at a final time, wherein the winning path metric value is the objective function value J(w).

The computed estimate $w_{max}$ of the carrier phase offset $\phi_0$ may be stored in a memory.

In some embodiments, the method 500 is performed blindly, i.e., without relying on a preamble or pilot. Indeed, in some embodiments, the CPM signal does not include any preamble or pilot.

In some embodiments, the estimate $w_{max}$ for the carrier phase offset may be displayed on a display screen, e.g., incorporated into a graph of carrier phase offset versus time.

In some embodiments, the method 500 includes performing a traceback process to recover information bits from the winning path of the Viterbi demodulation that corresponds to the maximum value of the objective function. In various embodiments, the recovered information bits may represent an audio stream, a video stream, an image, a data file, etc. The recovered information bits may be used to drive an output device such as a speaker, a display device, etc. The recovered information bits may be stored in a memory for later retrieval and/or analysis.

In some embodiments, the method 500 may also include phase shifting a second block of samples of the CPM signal by $-w_{max}$, and recovering information from the phase-shifted second block by performing Viterbi demodulation on the phase-shifted second block. In other words, the value $w_{max}$ determined in operation 520 based on the first sample block may be used to demodulate the second sample block without invoking the maximization process.

In some embodiments, the method 500 may also include phase shifting a local oscillator of the receiver by amount $-w_{max}$, to compensate for the carrier phase offset $\phi_0$.

Estimation of Carrier Frequency Offset and Carrier Phase Offset

Figure 6:
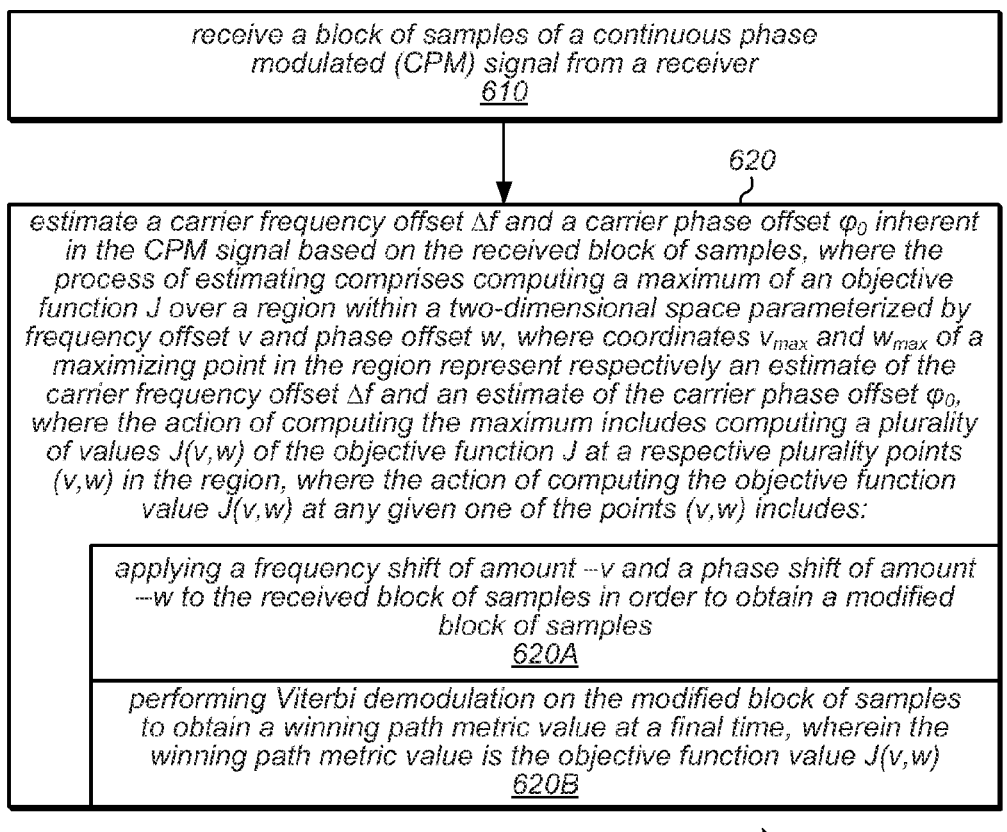
FIG. 6 is a flowchart illustrating one embodiment of a method for jointly estimating the carrier frequency offset Δf and carrier phase offset $\phi_0$.

In one set of embodiments, a method 600 may include the operations shown in FIG. 6. (The method 600 may include any subset of the features described above.) The method 600 may be performed by a digital system, e.g., by a computer system, by a set of one or more programmable hardware elements, by custom designed circuitry such as one or more ASICs, or by any combination of the foregoing.

At 610, the digital system may receive a block of samples of a continuous phase modulated (CPM) signal from a receiver. The CPM signal may be a single-h CPM signal or a multi-h CPM signal.

At 620, the digital system may estimate a carrier frequency offset $\Delta f$ and a carrier phase offset $\phi_0$ inherent in the CPM signal based on the received block of samples. The estimation process comprises computing a maximum of an objective function J over a region within a two-dimensional space parameterized by frequency offset v and phase offset w. The coordinates $v_{max}$ and $w_{max}$ of the maximizing point in the region represent respectively an estimate of the carrier frequency offset $\Delta f$ and an estimate of the carrier phase offset $\phi_0$. (The carrier frequency offset may include a Doppler shift due to motion of the receiver relative to a transmitter, and/or, a difference between a local oscillator frequency of the receiver and a local oscillator frequency of a transmitter.)

The action of computing the maximum includes computing a plurality of values J(v, w) of the objective function J at a respective plurality points (v, w) in the region. Any of a wide variety of known search algorithms may be employed to compute a maximum of the objective function.

The action of computing the objective function value J(v, w) at any given one of the points (v, w) comprises: applying a frequency shift of amount –v and a phase shift of amount –w to the received block of samples in order to obtain a modified block of samples; and performing Viterbi demodulation on the modified block of samples to obtain a winning path metric value at a final time, wherein the winning path metric value is the objective function value J(v,w).

The estimate $v_{max}$ of the carrier frequency offset $\Delta f$ and the estimate $w_{max}$ of the carrier phase offset $\phi_0$ may be stored in a memory.

In some embodiments, the method 600 is performed blindly, i.e., without relying on a preamble or pilot. Indeed, in some embodiments, the CPM signal does not include any preamble or pilot.

In some embodiments, the estimate $v_{max}$ and the estimate $w_{max}$ may be displayed on a display screen.

In some embodiments, the method 600 may include performing a traceback process to recover information bits from the winning path of the Viterbi demodulation that corresponds to the maximum value of the objective function. In various embodiments, the recovered information bits may represent an audio stream, a video stream, an image, a data file, etc. The recovered information bits may be used to drive an output device such as a speaker, a display device, etc. The recovered information bits may be stored in a memory for later retrieval and/or analysis.

In some embodiments, the method 600 may also include applying a frequency shift of $-v_{max}$ and a phase shift of $-w_{max}$ to a second block of samples of the CPM signal to obtain a modified second block of samples; and recovering information from the modified second block by performing Viterbi demodulation on the modified second block. In other words, the values $v_{max}$ and $w_{max}$ determined in operation 420 based on the first sample block may be used to demodulate the second sample block without invoking the maximization process.

Computer System

FIG. 7 illustrates one embodiment of a computer system 700 that may be used to perform any of the method embodiments described herein, or, any combination of the method embodiments described herein, or any subset of any of the method embodiments described herein, or, any combination of such subsets.

Computer system 700 may include a processing unit 710, a system memory 712, a set 715 of one or more storage devices, a communication bus 720, a set 725 of input devices, and a display system 730.

System memory 712 may include a set of semiconductor devices such as RAM devices (and perhaps also a set of ROM devices).

Storage devices 715 may include any of various storage devices such as one or more memory media and/or memory access devices. For example, storage devices 715 may include devices such as a CD/DVD-ROM drive, a hard disk, a magnetic disk drive, magnetic tape drives, etc.

Processing unit 710 is configured to read and execute program instructions, e.g., program instructions stored in system memory 712 and/or on one or more of the storage devices 715. Processing unit 710 may couple to system memory 712 through communication bus 720 (or through a system of interconnected busses, or through a network). The program instructions configure the computer system 700 to implement a method, e.g., any of the method embodiments described herein, or, any combination of the method embodiments described herein, or, any subset of any of the method embodiments described herein, or any combination of such subsets.

Processing unit 710 may include one or more processors (e.g., microprocessors).

One or more users may supply input to the computer system 700 through the input devices 725. Input devices 725 may include devices such as a keyboard, a mouse, a touch-sensitive pad, a touch-sensitive screen, a drawing pad, a track ball, a light pen, a data glove, eye orientation and/or head orientation sensors, a microphone (or set of microphones), or any combination thereof.

The display system 730 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 700 may include other devices, e.g., devices such as one or more graphics accelerators, one or more speakers, a sound card, a video camera and a video card, a data acquisition system.

In some embodiments, computer system 700 may include one or more communication devices 735, e.g., a network interface card for interfacing with a computer network. As another example, the communication device 735 may include one or more specialized interfaces for communication via any of a variety of established communication standards or protocols (e.g., USB, Firewire, PCI, PCI Express, PXI).

The computer system may be configured with a software infrastructure including an operating system, and perhaps also, one or more graphics APIs (such as OpenGL®, Direct3D, Java 3D™). In some embodiments, the software infrastructure may include National Instruments Lab-VIEW™ software, and/or, LabVIEW™ FPGA.

In some embodiments, the computer system 700 may be configured to interface with a receiver 750. The receiver may be configured to receive a CPM signal (from a communication channel) as variously described herein. The receiver may operate under the control of software executing on processor 710 and/or software executing on the receiver itself.

In some embodiments, the receiver may include one or more programmable hardware elements and/or one or more microprocessors for performing digital processing on digital data (e.g., on sampled baseband CPM signals) as variously described herein.

Simulated Test Results

The inventors of this patent have implemented a CPM modulator and Viterbi-based CPM demodulator in software. A channel model to simulate the AWGN (additive white Gaussian noise), CFO impairment, CPO impairment, etc. has also been implemented in software. This section discusses the results of tests using the modulator, demodulator and channel model.

Test Scenario-1: Single h=7/10

Figure 8A:
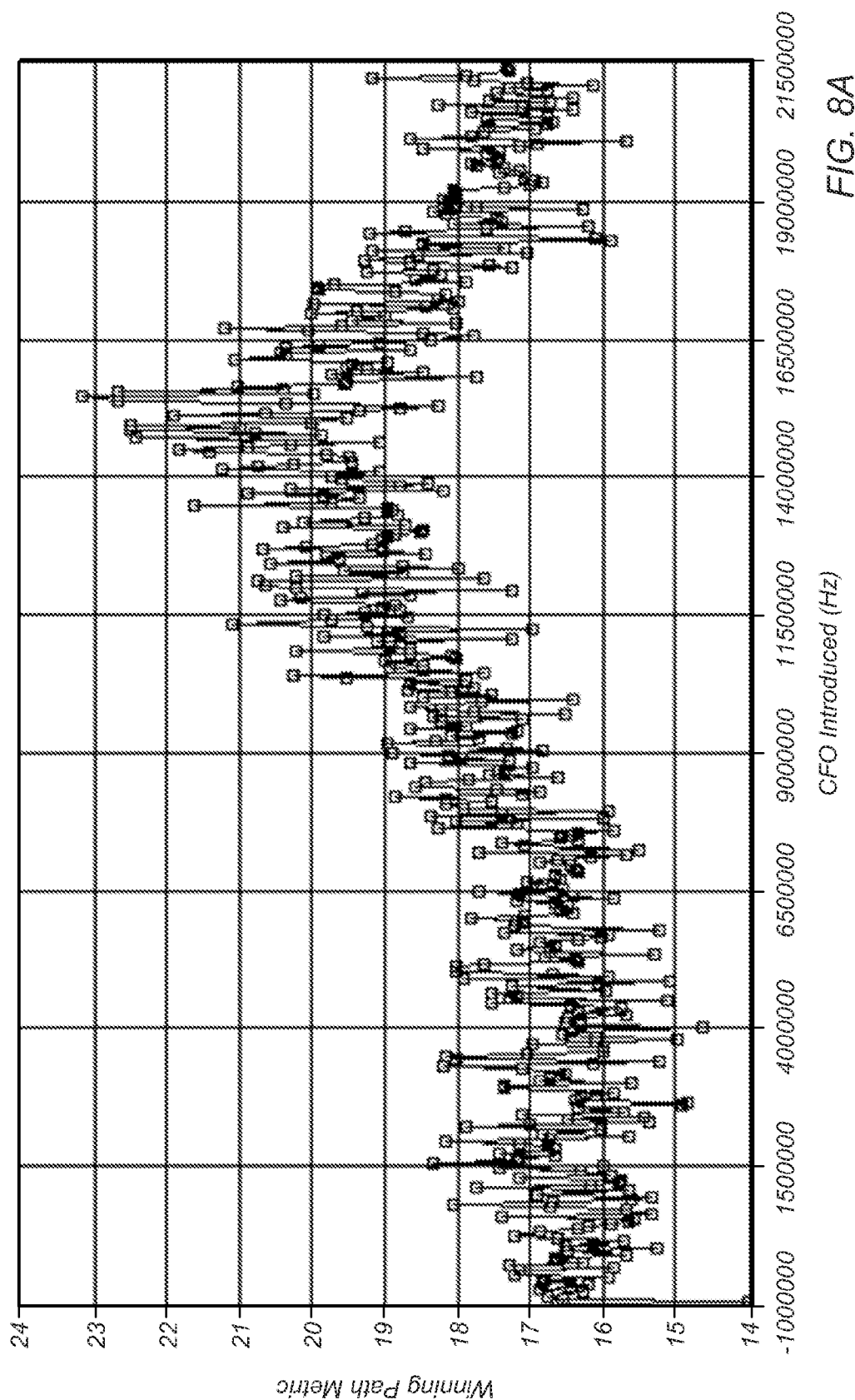
FIG. 8A is a graph of winning path metric vs. CFO introduced, for single-h quaternary CPM (h=7/10) at SNR=0 dB, with no correction, with rectangular window, traceback length=20 symbols, and symbol rate=3.84 MHz.
Figure 8B:
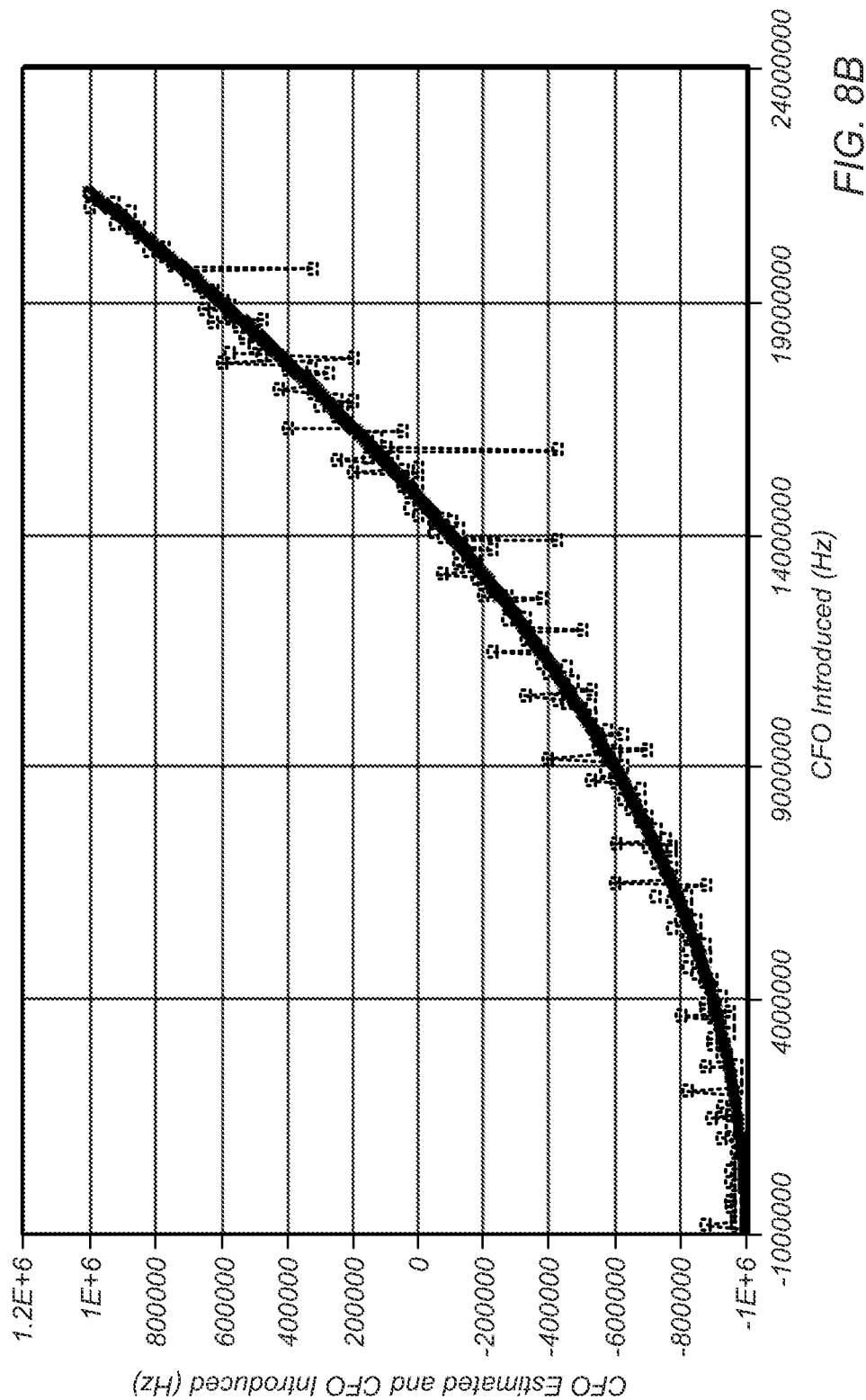
FIG. 8B is a graph of CFO estimated vs. CFO introduced, for single-h quaternary CPM (h=7/10) at SNR=0 dB, with rectangular window, traceback length=20 symbols, and symbol rate=3.84 MHz.
Figure 8C:
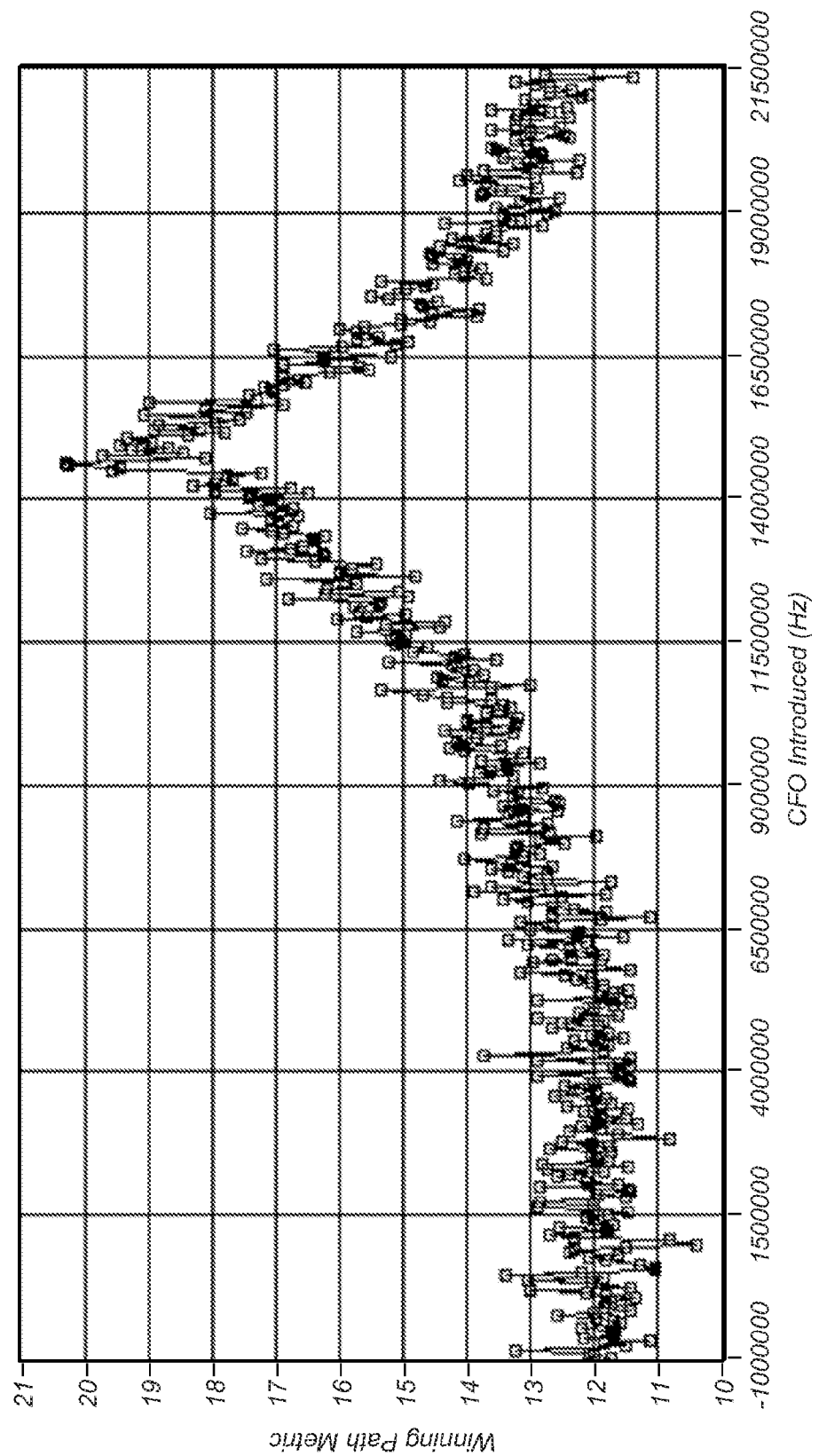
FIG. 8C is a graph of winning path metric vs. CFO introduced, for a single-h quaternary CPM (h=7/10) at SNR=5 dB, with no correction, with rectangular window, traceback length=20 symbols, and symbol rate=3.84 MHz.
Figure 8D:
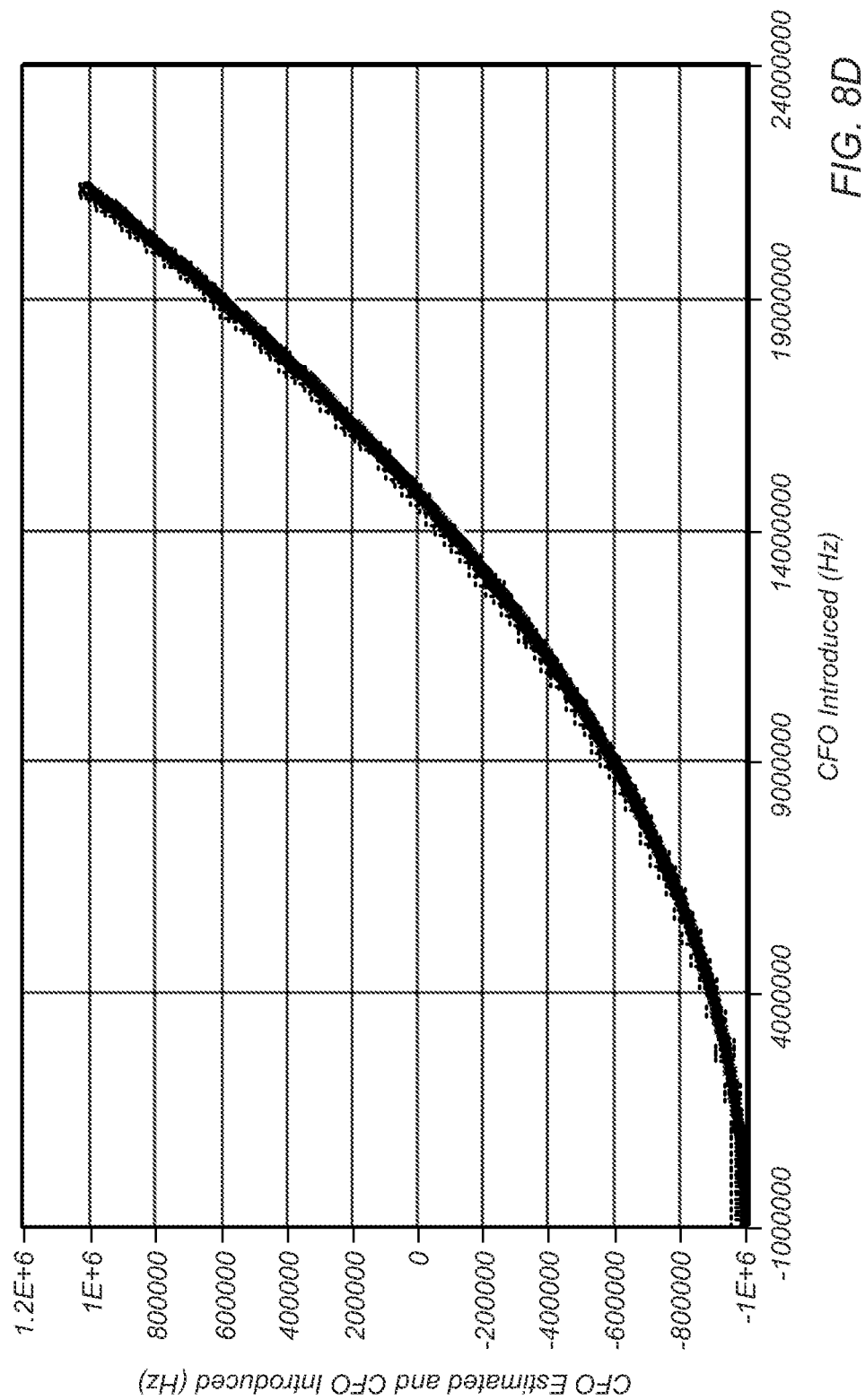
FIG. 8D is a graph of CFO estimated vs. CFO introduced, for single-h quaternary CPM (h=7/10) at SNR=5 dB, with rectangular window, traceback length=20 symbols, and symbol rate=3.84 MHz.
Figure 8E:
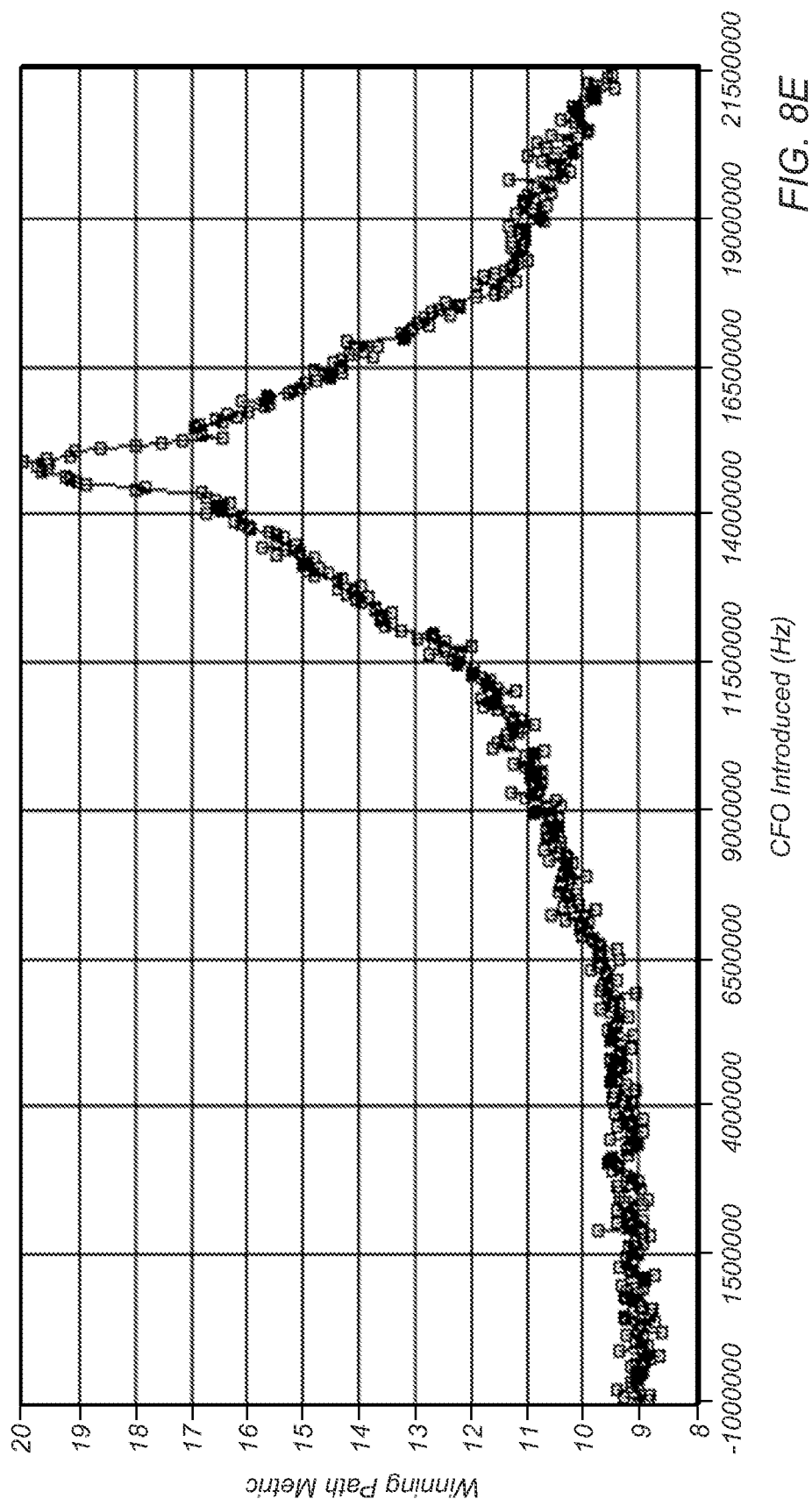
FIG. 8E is a graph of winning path metric vs. CFO introduced, for single-h quaternary CPM (h=7/10) at SNR=15 dB, with no correction, with rectangular window, traceback length=20 symbols, and symbol rate=3.84 MHz.

In this test, a CPM signal with single h=7/10, and N=100 symbols is generated. The symbol rate configured is 3.84 MHz. The signal is impaired with a SNR=0 dB, 5 dB, and 15 dB. For each of the given SNR values, a CFO impairment ($\Delta f$ in the range of −1 MHz to +1 MHz in non-linear steps of 10 Hz) is added and the winning path metric value PM'(N, $\Delta f$, $\phi_0$) is computed using the Viterbi demodulator. The FIGS. 8A, 8C and 8E indicate the winning path metric PM'(N, $\Delta f$, $\phi_0$) vs. $\Delta f$ for each of the SNR values. It can be clearly seen that the winning path metric is approximately equal to the traceback length of the Viterbi demodulator (i.e., N in equations (6) and (7) given above), if $\Delta f$=0 Hz.

Figure 8F:
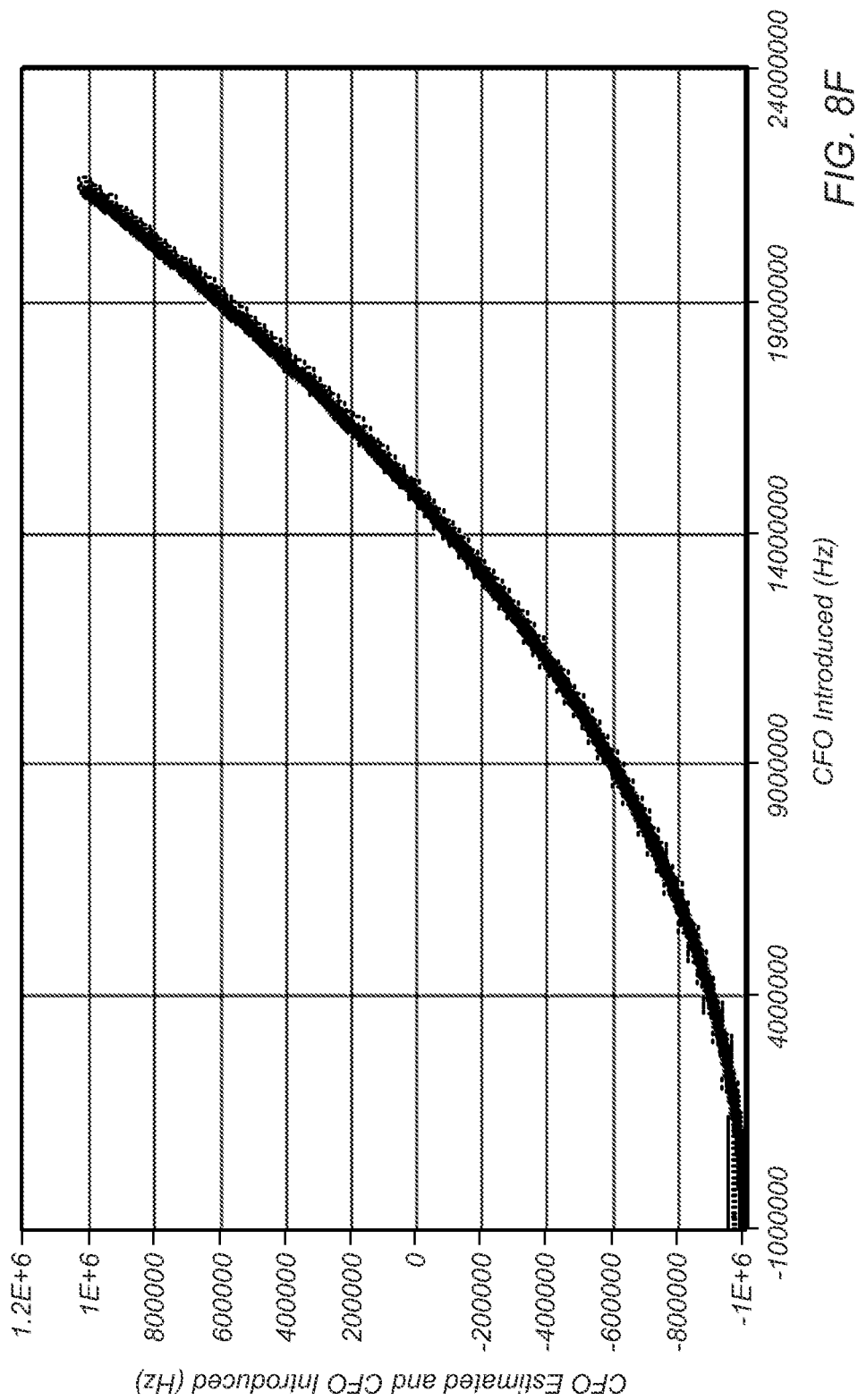
FIG. 8F is graph of CFO estimated vs. CFO introduced, for single-h quaternary CPM (h=7/10) at SNR=15 dB, with rectangular window, traceback length=20 symbols, and symbol rate=3.84 MHz.

For each SNR and for each CFO ($\Delta f$) impaired CPM signal, PM'(N, $\Delta f$, $\phi_0$) is computed, and the maximum of the PM'(N, $\Delta f$, $\phi_0$) is obtained. The value of $\Delta f$ that corresponds to the maximum value of PM'(N, $\Delta f$, $\phi_0$) is the CFO/Doppler estimate $\Delta f_o$. The FIGS. 8B, 8D and 8F indicate the CFO introduced ($\Delta f_i$) vs. CFO estimated ($\Delta f_o$).

Test Scenario-2: Multi-h={12/16, 13/16}

Figure 9A:
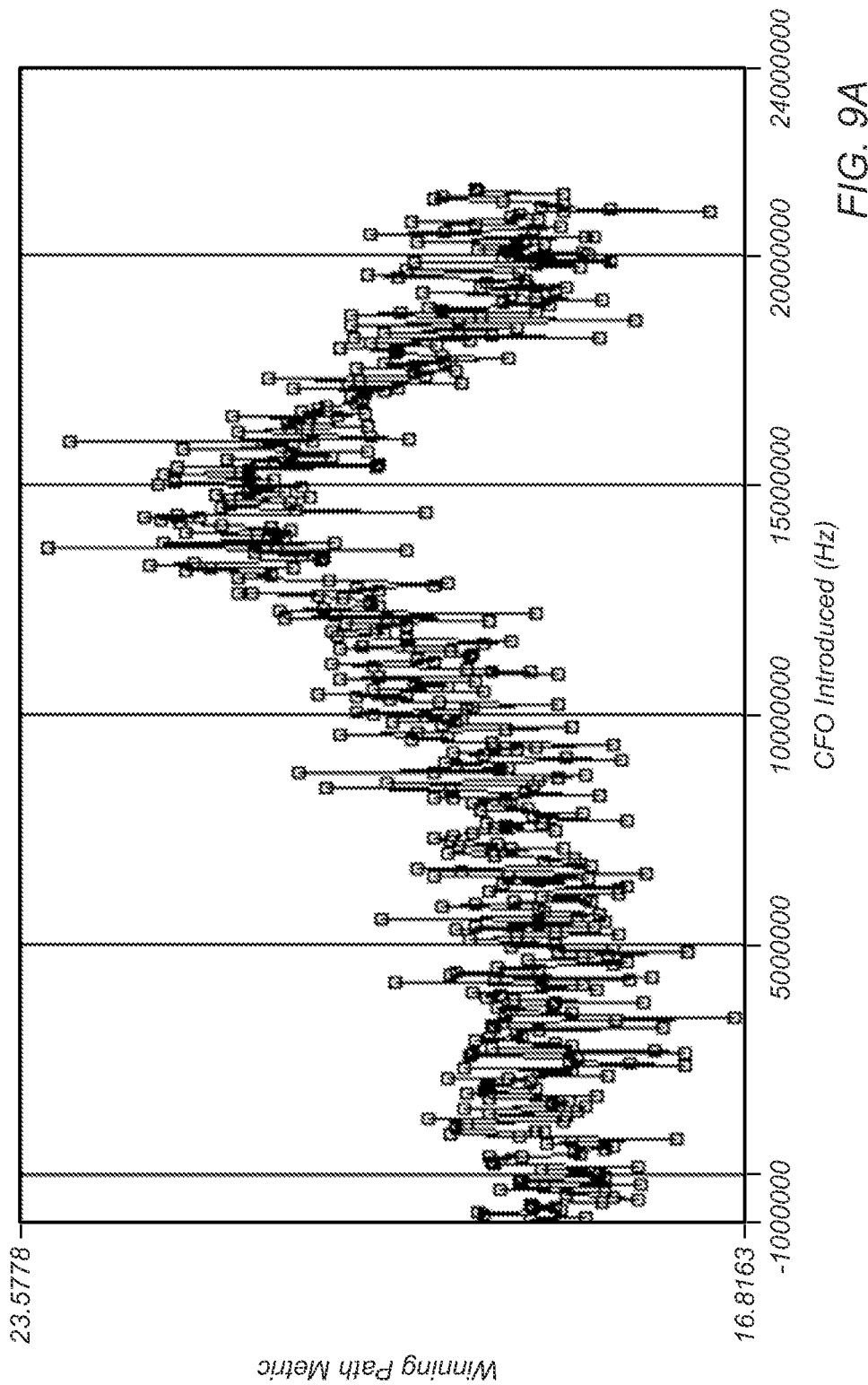
FIG. 9A is a graph of winning path metric vs. CFO introduced, for multi-h quaternary CPM (h={12/16, 13/16}) at SNR=0 dB, with no correction, with rectangular window, traceback length=20 symbols, and symbol rate=3.84 MHz.
Figure 9B:
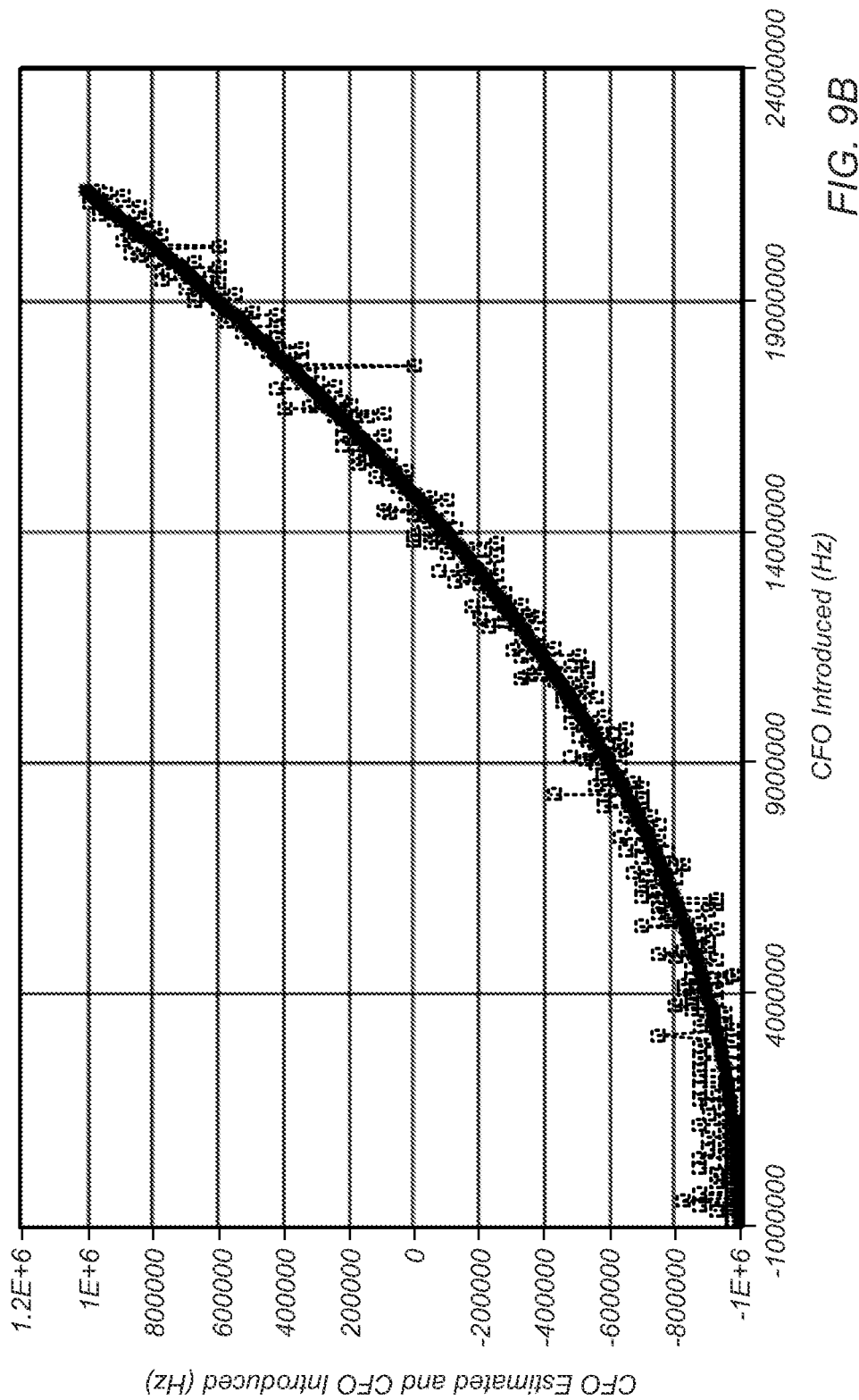
FIG. 9B is a graph of CFO estimated vs. CFO introduced, for multi-h quaternary CPM (h={12/16, 13/16}) at SNR=0 dB, with rectangular window, traceback length=20 symbols, and symbol rate=3.84 MHz.
Figure 9C:
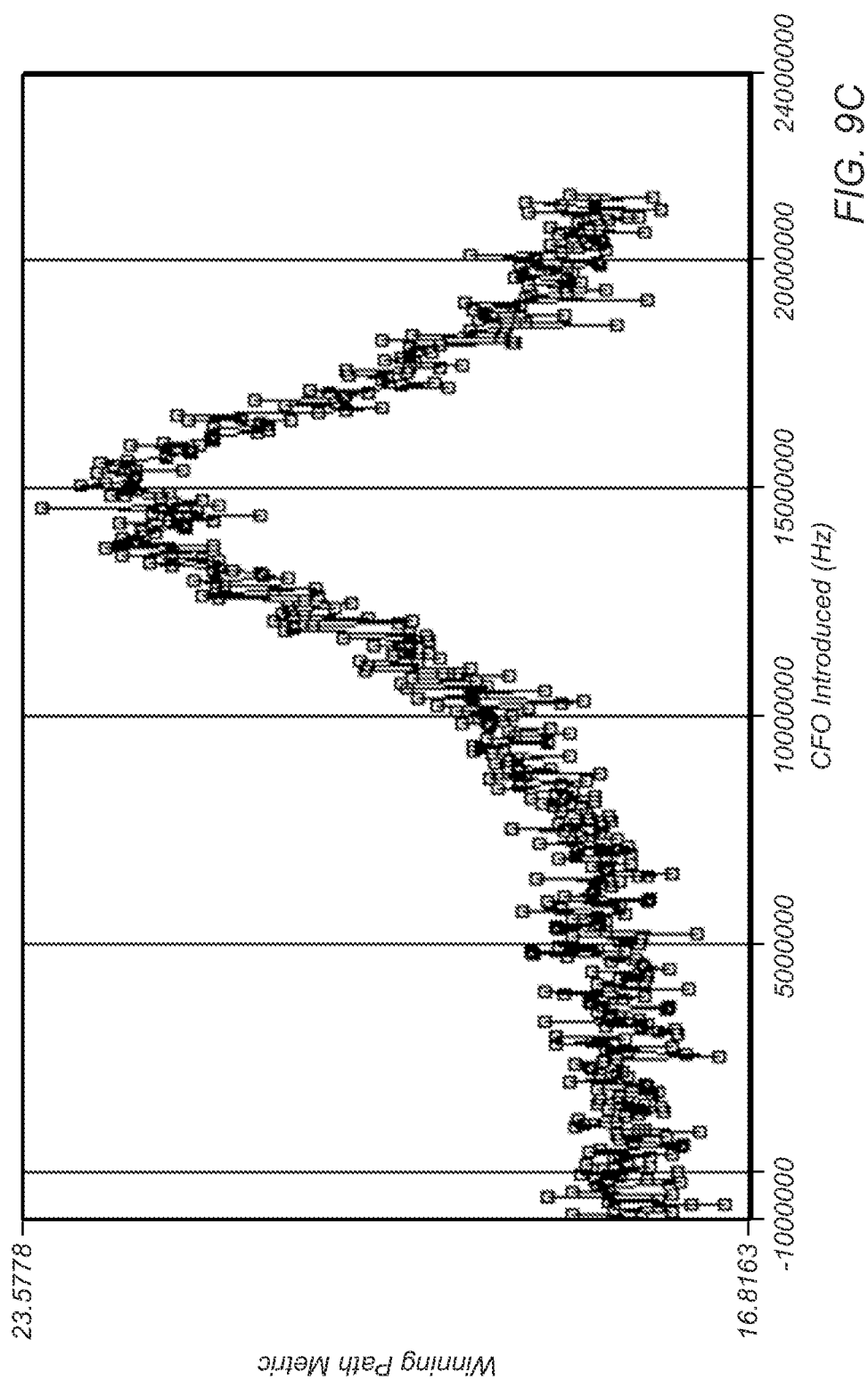
FIG. 9C is a graph of winning path metric vs. CFO introduced, for multi-quaternary CPM (h={12/16, 13/16}) at SNR=5 dB, with no correction, with rectangular window, traceback length=20 symbols, and symbol rate=3.84 MHz.
Figure 9D:
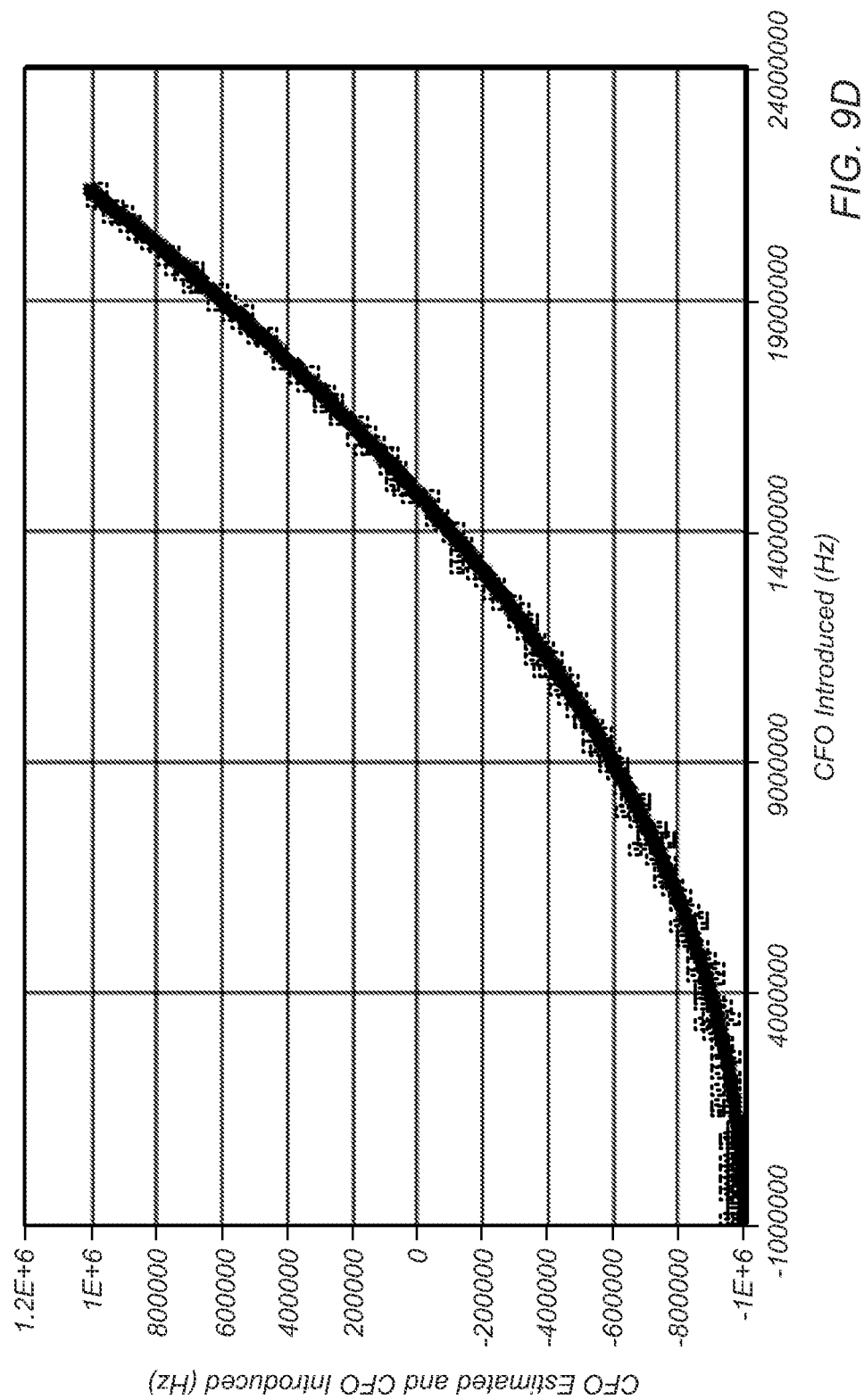
FIG. 9D is a graph of CFO estimated vs. CFO introduced, for multi-h quaternary CPM (h={12/16, 13/16}) at SNR=5 dB, with rectangular window, traceback length=20 symbols, and symbol rate=3.84 MHz.
Figure 9E:
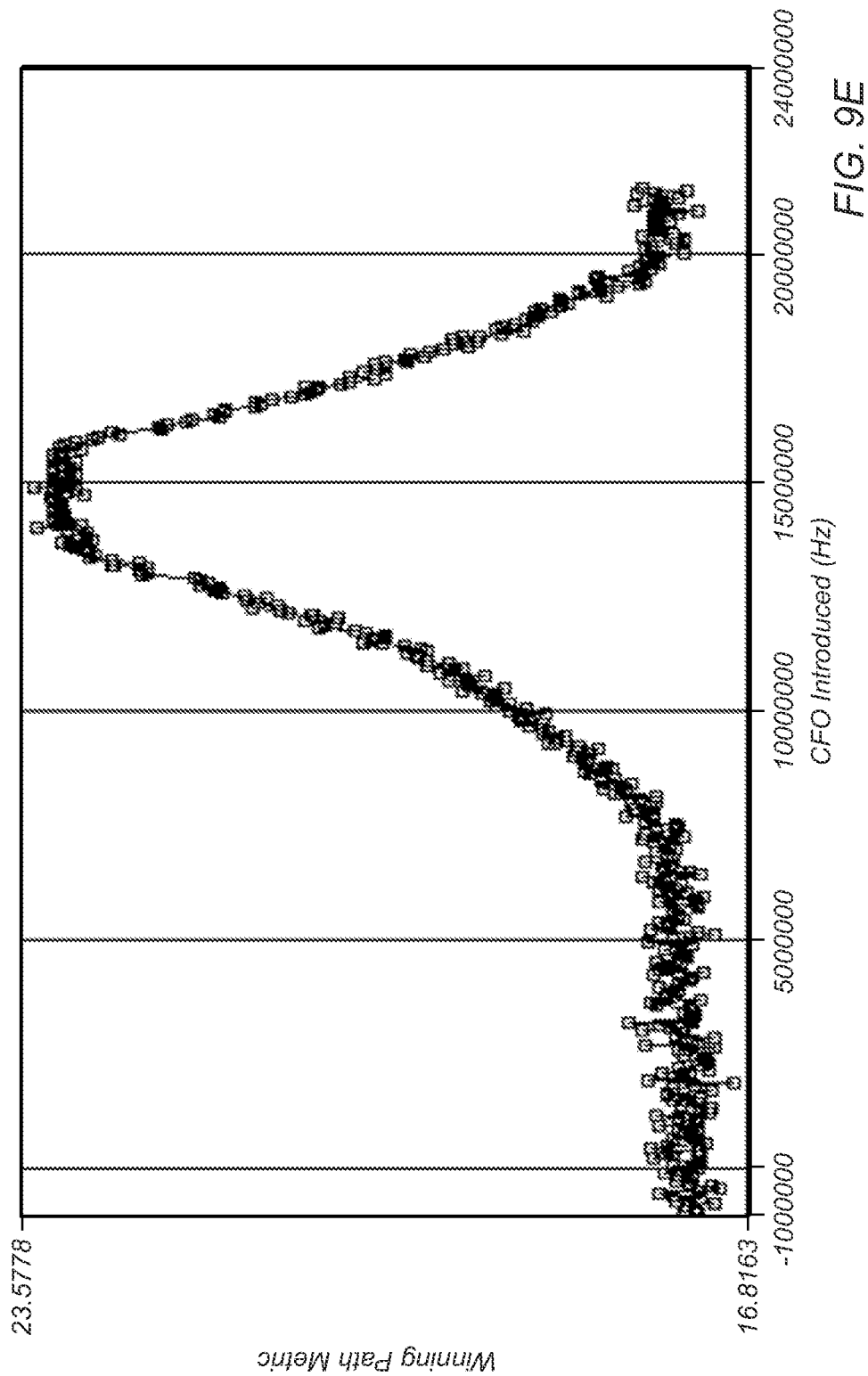
FIG. 9E is a graph of winning path metric vs. CFO introduced, for multi-h quaternary CPM (h={12/16, 13/16}) at SNR=15 dB, with no correction, with rectangular window, traceback length=20 symbols, and symbol rate=3.84 MHz.

In this test, a CPM signal with single h={12/16, 13/16}, and N=100 symbols is generated. The symbol rate configured is 3.84 MHz. The signal is impaired with a SNR=0 dB, 5 dB and 15 dB. For each of the given SNR values, a CFO impairment ($\Delta f$ in the range of −1 MHz to +1 MHz in non-linear steps of 10 Hz) is added and the winning path metric PM'(N, $\Delta f$, $\phi_0$) is computed using the Viterbi demodulator. The FIGS. 9A, 9C and 9E indicate the winning path metric PM'(N, $\Delta f$, $\phi_0$) vs. $\Delta f$ for each of the SNR values. It can be clearly seen that the winning path metric is approximately equal to the traceback length of the Viterbi demodulator (i.e., N in equations 6, 7 mentioned above), if $\Delta f$=0 Hz.

Figure 9F:
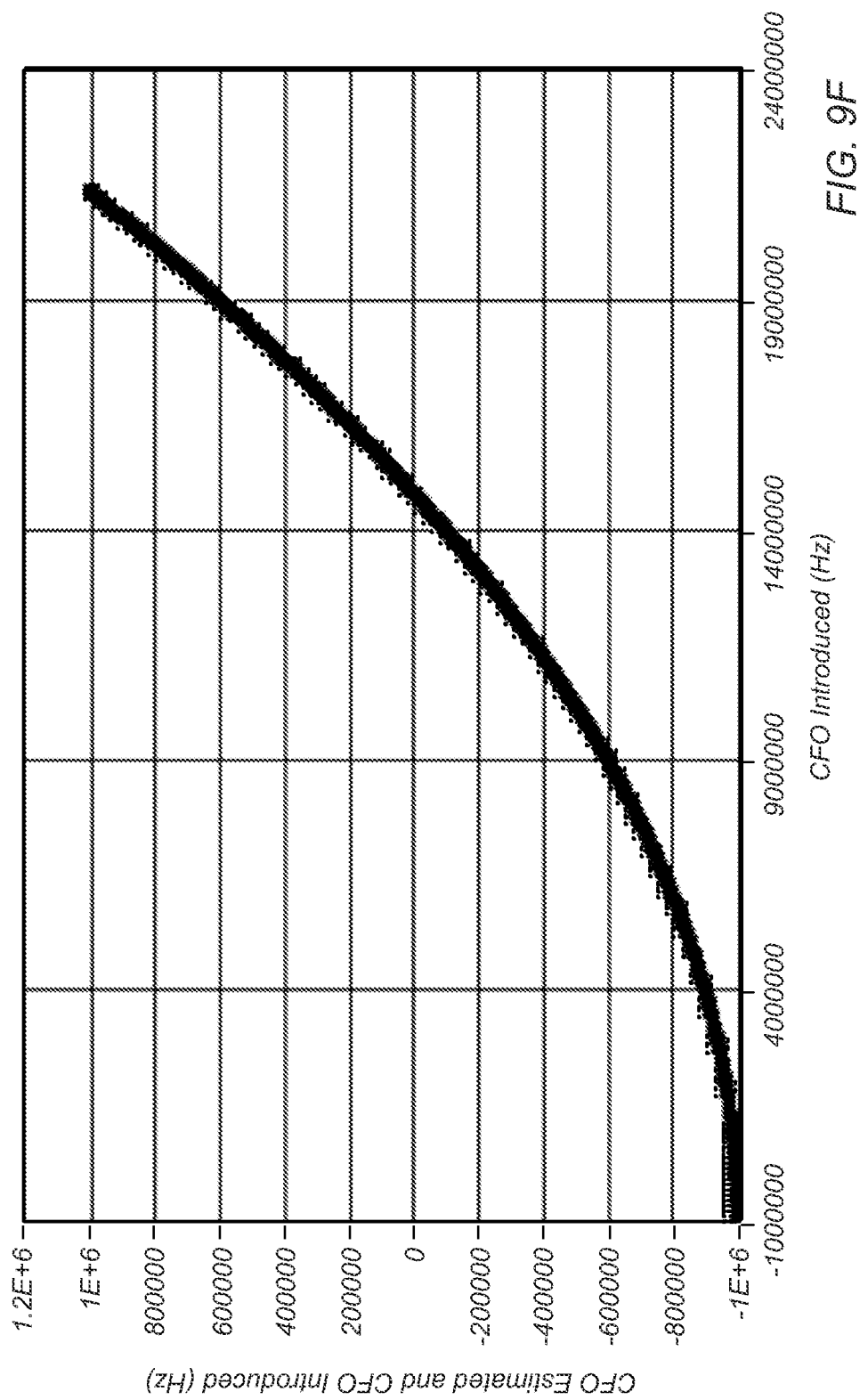
FIG. 9F is a graph of CFO estimated vs. CFO introduced, for multi-h quaternary CPM (h={12/16, 13/16}) at SNR=15 dB, with rectangular window, traceback length=20 symbols, and symbol rate=3.84 MHz.

For each SNR and for each CFO ($\Delta f$) impaired CPM signal, PM'(N, $\Delta f$, $\phi_0$) is computed, and the max of the PM'(N, $\Delta f$, $\phi_0$) is obtained. The $\Delta f$ that corresponds to the maximum value of PM'(N, $\Delta f$, $\phi_0$) is the CFO/Doppler estimate $\Delta f_o$. The FIGS. 9B, 9D and 9F indicate the CFO introduced ($\Delta f$) vs. CFO estimated ($\Delta f_o$).

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   receiving a block of samples of a continuous phase modulated (CPM) signal from a receiver;
   estimating a carrier phase offset $\phi_0$ inherent in the CPM signal based on the received block of samples, wherein said estimating comprises computing a maximum of an objective function J as a function of phase offset w, wherein a maximizing value $w_{max}$ of the phase offset w represents an estimate of the carrier phase offset $\phi_0$, wherein said computing the maximum includes computing a plurality of values J(w) of the objective function J at a respective plurality of values of the phase offset w, wherein said computing the objective function value J(w) at any given one of the values of the phase offset w comprises:
      phase shifting the received block of samples by −w to obtain a phase shifted block of samples;
      performing Viterbi demodulation on the phase shifted block of samples to obtain a winning path metric value at a final time, wherein the winning path metric value is the objective function value J(w);
   storing the estimate of the carrier phase offset in a memory.

2. The method of claim 1, wherein the CPM signal does not include a preamble or pilot.

3. The method of claim 1, wherein the CPM signal is a single-h CPM signal.

4. The method of claim 1, wherein the CPM signal is a multi-h CPM signal.

5. The method of claim 1, further comprising:
   performing a traceback process to recover information bits from a winning path of the Viterbi demodulation corresponding to the maximum value of the objective function.

6. The method of claim 1, further comprising:
   phase shifting a second block of samples of the CPM signal by amount $-w_{max}$;
   recovering information from the phase-shifted second block by performing Viterbi demodulation on the phase-shifted second block.

7. The method of claim 1, further comprising:
   phase shifting a local oscillator of the receiver by amount $-w_{max}$.

8. A non-transitory computer-accessible memory medium storing program instructions that are executable by a computer system, wherein the program instructions, when executed by the computer system, cause the computer system to:
   receive a block of samples of a continuous phase modulated (CPM) signal from a receiver;
   estimate a carrier phase offset $\phi_0$ inherent in the CPM signal based on the received block of samples, wherein said estimating comprises computing a maximum of an objective function J as a function of phase offset w, wherein a maximizing value $w_{max}$ of the phase offset w represents an estimate of the carrier phase offset $\phi_0$, wherein said computing the maximum includes computing a plurality of values J(w) of the objective function J at a respective plurality of values of the phase offset w, wherein said computing the objective function value J(w) at any given one of the values of the phase offset w comprises:
      phase shifting the received block of samples by −w to obtain a phase shifted block of samples;
      performing Viterbi demodulation on the phase shifted block of samples to obtain a winning path metric value at a final time, wherein the winning path metric value is the objective function value J(w); and
   store the estimate of the carrier phase offset in a memory.

9. The memory medium of claim 8, wherein the CPM signal does not include a preamble or pilot.

10. The memory medium of claim 8, wherein the CPM signal is a single-h CPM signal.

11. The memory medium of claim 8, wherein the CPM signal is a multi-h CPM signal.

12. The memory medium of claim 8, wherein the program instructions, when executed by the computer system, further cause the computer system to:
perform a traceback process to recover information bits from a winning path of the Viterbi demodulation corresponding to the maximum value of the objective function.

13. The memory medium of claim 8, wherein the program instructions, when executed by the computer system, further cause the computer system to:
phase shift a second block of samples of the CPM signal by amount $-w_{max}$; and
recover information from the phase-shifted second block by performing Viterbi demodulation on the phase-shifted second block.

14. The memory medium of claim 8, wherein the program instructions, when executed by the computer system, further cause the computer system to:
phase shift a local oscillator of the receiver by amount $-w_{max}$.

15. A computer system comprising:
a processor; and
a non-transitory memory medium storing program instructions that are executable by the processor, wherein the program instructions, when executed by the processor, cause the processor to:
receive a block of samples of a continuous phase modulated (CPM) signal from a receiver;
estimate a carrier phase offset $\phi_0$ inherent in the CPM signal based on the received block of samples, wherein said estimating comprises computing a maximum of an objective function J as a function of phase offset w, wherein a maximizing value $w_{max}$ of the phase offset w represents an estimate of the carrier phase offset $\phi_0$, wherein said computing the maximum includes computing a plurality of values J(w) of the objective function J at a respective plurality of values of the phase offset w, wherein said computing the objective function value J(w) at any given one of the values of the phase offset w comprises:
phase shifting the received block of samples by $-w$ to obtain a phase shifted block of samples;
performing Viterbi demodulation on the phase shifted block of samples to obtain a winning path metric value at a final time, wherein the winning path metric value is the objective function value J(w); and
store the estimate of the carrier phase offset in a memory.

16. The computer system of claim 15, wherein the CPM signal does not include a preamble or pilot.

17. The computer system of claim 15, wherein the CPM signal is a single-h CPM signal.

18. The computer system of claim 15, wherein the CPM signal is a multi-h CPM signal.

19. The computer system of claim 15, wherein the program instructions, when executed by the processor, further cause the processor to:
perform a traceback process to recover information bits from a winning path of the Viterbi demodulation corresponding to the maximum value of the objective function.

20. The computer system of claim 15, wherein the program instructions, when executed by the processor, further cause the processor to:
phase shift a second block of samples of the CPM signal by amount $-w_{max}$; and
recover information from the phase-shifted second block by performing Viterbi demodulation on the phase-shifted second block.

21. The computer system of claim 15, wherein the program instructions, when executed by the processor, further cause the processor to:
phase shift a local oscillator of the receiver by amount $-w_{max}$.

* * * * *